(12) United States Patent
Tada et al.

(10) Patent No.: US 8,902,367 B2
(45) Date of Patent: Dec. 2, 2014

(54) COMPUTER-READABLE STORAGE MEDIUM STORING IMAGE PROCESSING PROGRAM, IMAGE PROCESSING DEVICE AND IMAGE PROCESSING METHOD

(71) Applicant: Fujitsu Limited, Kawasaki-shi, Kanagawa (JP)

(72) Inventors: Atsuko Tada, Tokorozawa (JP); Ryoichi Funabashi, Kawasaki (JP); Ryuta Tanaka, Machida (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 13/675,393

(22) Filed: Nov. 13, 2012

(65) Prior Publication Data

US 2013/0314604 A1    Nov. 28, 2013

(30) Foreign Application Priority Data

Jan. 20, 2012  (JP) ................................ 2012-010168

(51) Int. Cl.
*H04N 9/64* (2006.01)
*G06T 11/00* (2006.01)
*H04N 5/14* (2006.01)
*H04N 9/74* (2006.01)

(52) U.S. Cl.
CPC ............... *H04N 9/643* (2013.01); *G06T 11/00* (2013.01); *H04N 5/142* (2013.01); *H04N 9/74* (2013.01)
USPC .......................................... 348/649; 348/571

(58) Field of Classification Search
USPC ....................................................... 348/649
See application file for complete search history.

(56) References Cited

U.S. PATENT DOCUMENTS

| 2008/0187224 A1 | 8/2008 | Wang et al. | |
| 2011/0206282 A1* | 8/2011 | Aisaka et al. | 382/195 |
| 2013/0127844 A1* | 5/2013 | Koeppel et al. | 345/419 |

FOREIGN PATENT DOCUMENTS

JP    2008-204466    9/2008

OTHER PUBLICATIONS

Patrick Perez, Michel Gangnet, Andrew Blake, "Poisson Image Editing", Microsoft Reserch UK, 2003 (pp. 313-318).
P.Viola and M.Jones, "Rapid object detection using a boosted cascade of simple features," in Proc.IEEE Computer Vision and Pattern Recognition, pp. I_511-I_518, 2001 (pp. I511 I 518).

* cited by examiner

*Primary Examiner* — Jeffery Harold
*Assistant Examiner* — Justin Sanders
(74) *Attorney, Agent, or Firm* — Staas & Halsey LLP

(57) ABSTRACT

A computer-readable storage medium storing an image processing program that causes a computer to execute a process includes, synthesizing, for each of frames included in a video image and to be processed, a synthesis image with an image of a synthesis target region existing in the frame by repeatedly executing a calculation using a Poisson's equation on the basis of the image of synthesis target region existing in the frame to be processed and the synthesis image to be replaced with the image of the synthesis target region, and thereby calculating, from an initial value image, a synthesis result image corresponding to a result obtained by synthesizing the synthesis image with the synthesis target region so as to sequentially execute a synthesis process on the frames of the video image; and setting, for each of the frames to be processed, initial values by setting, as the initial value image.

19 Claims, 17 Drawing Sheets

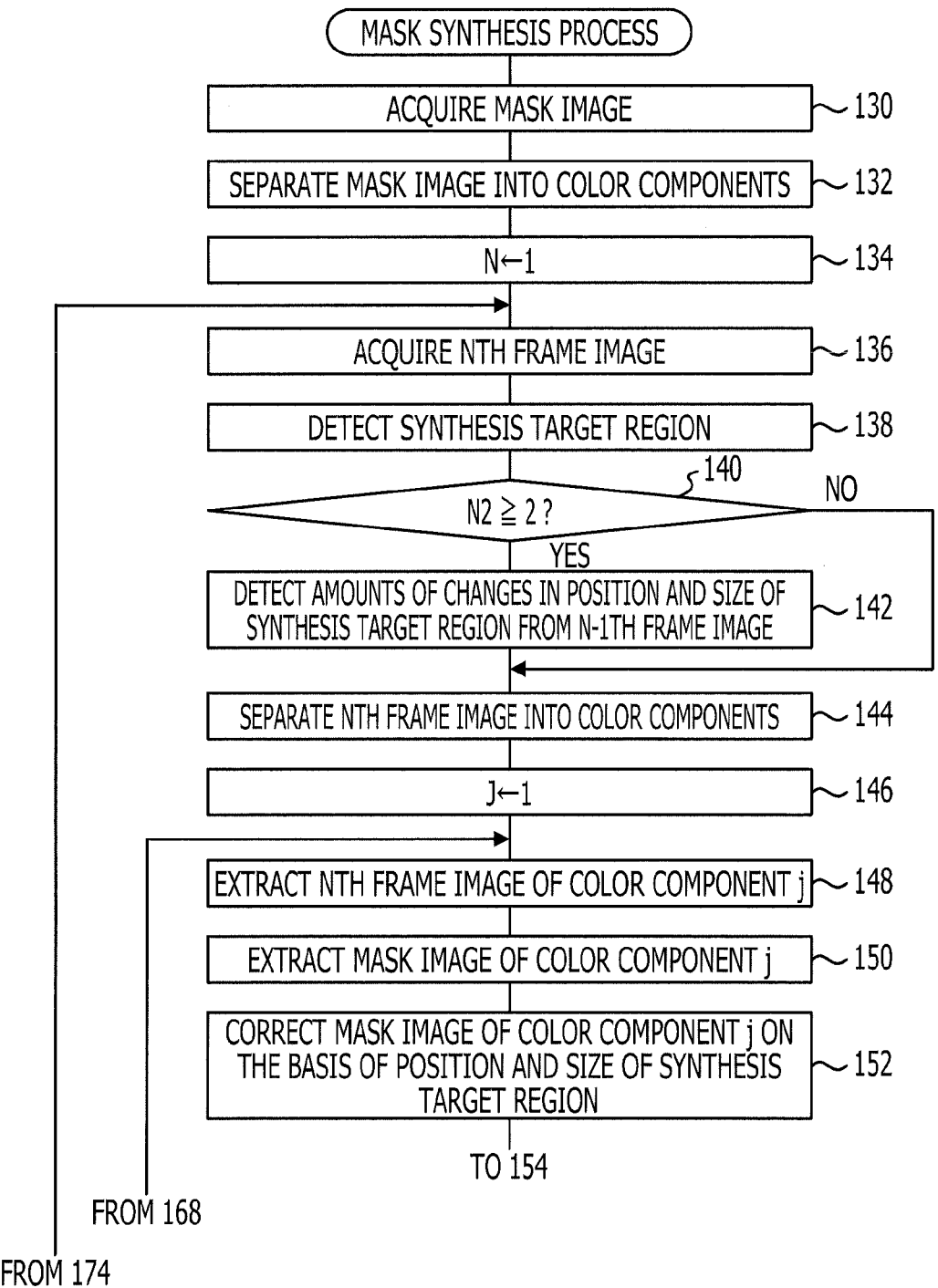

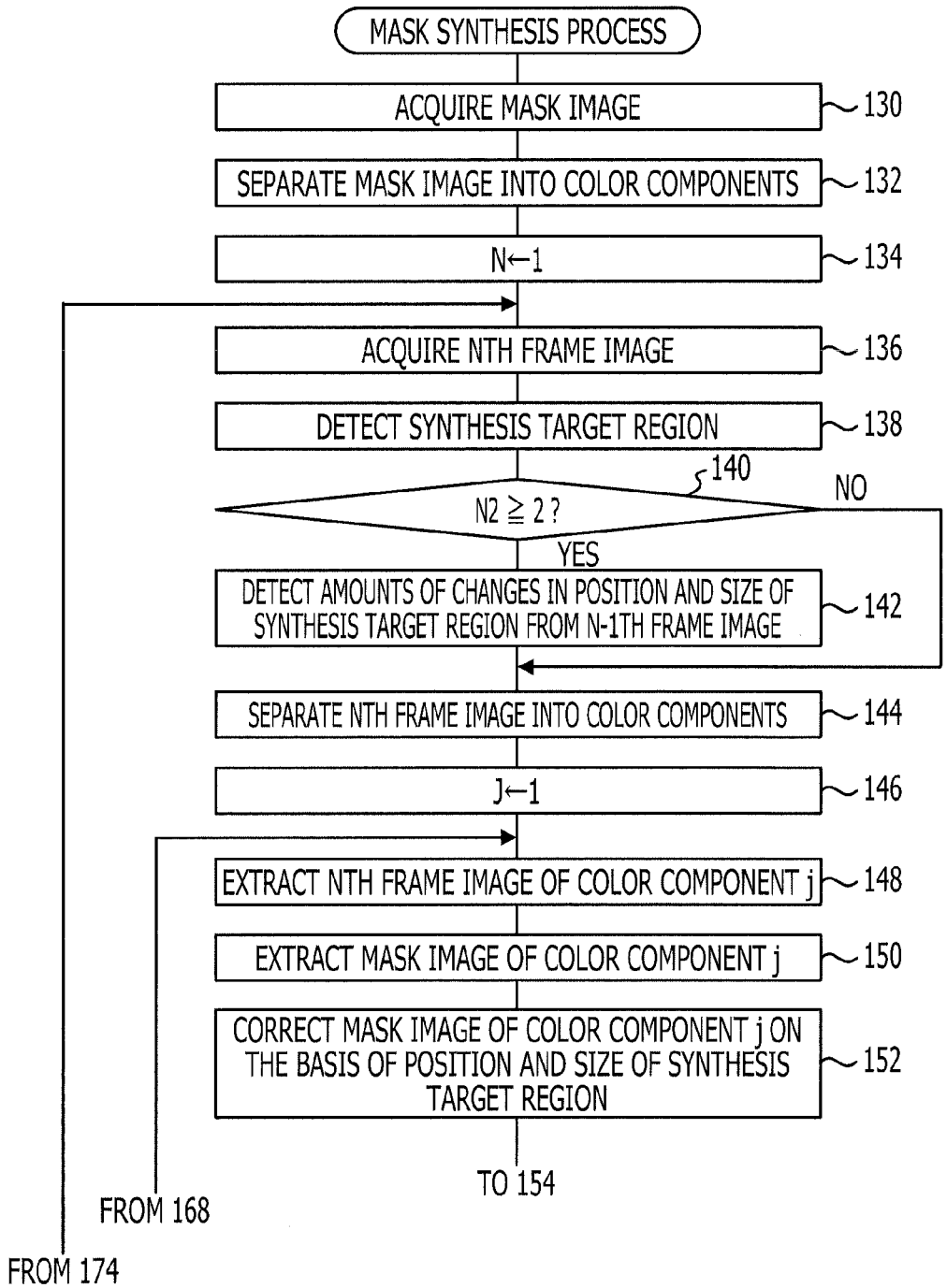

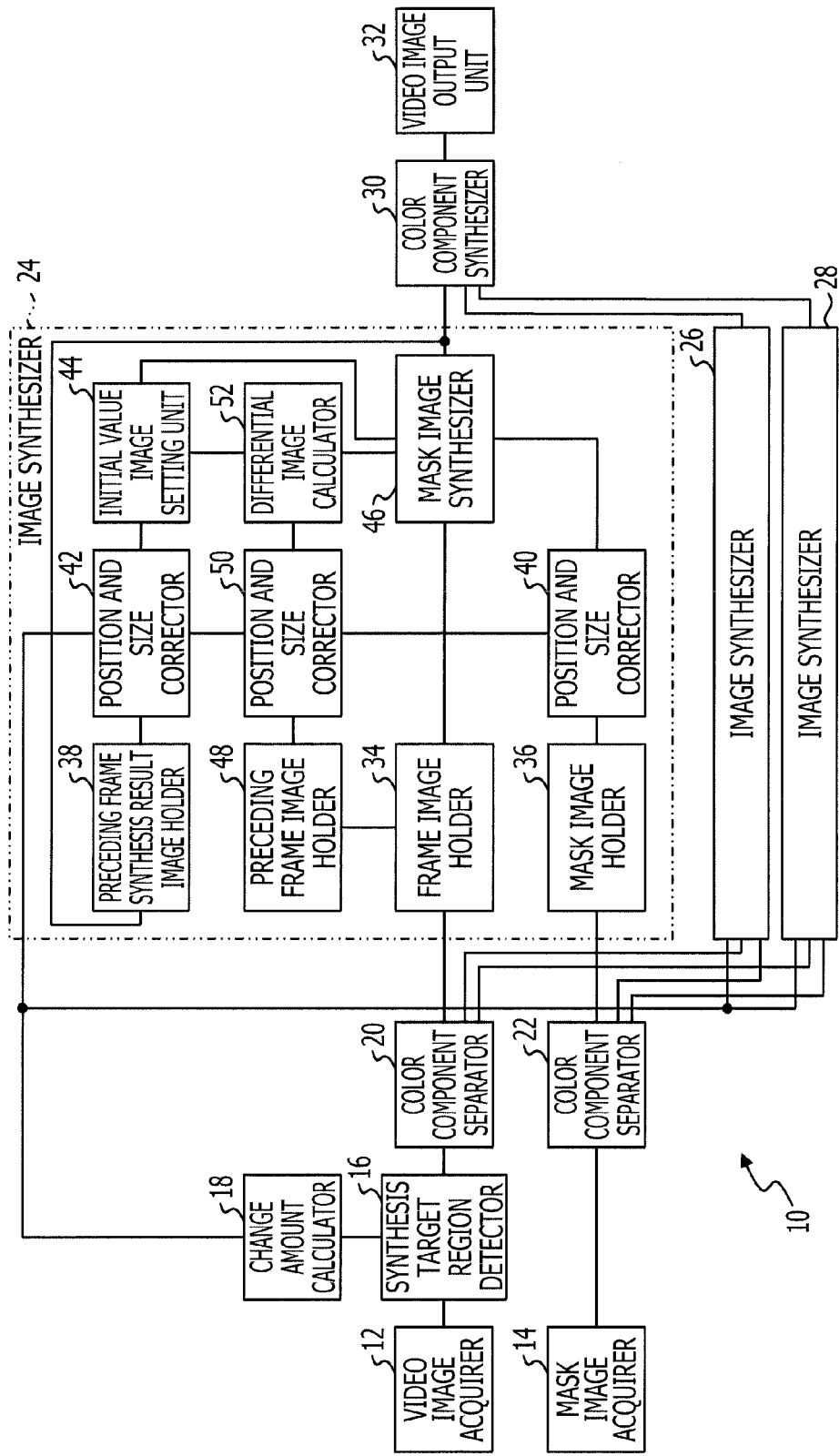

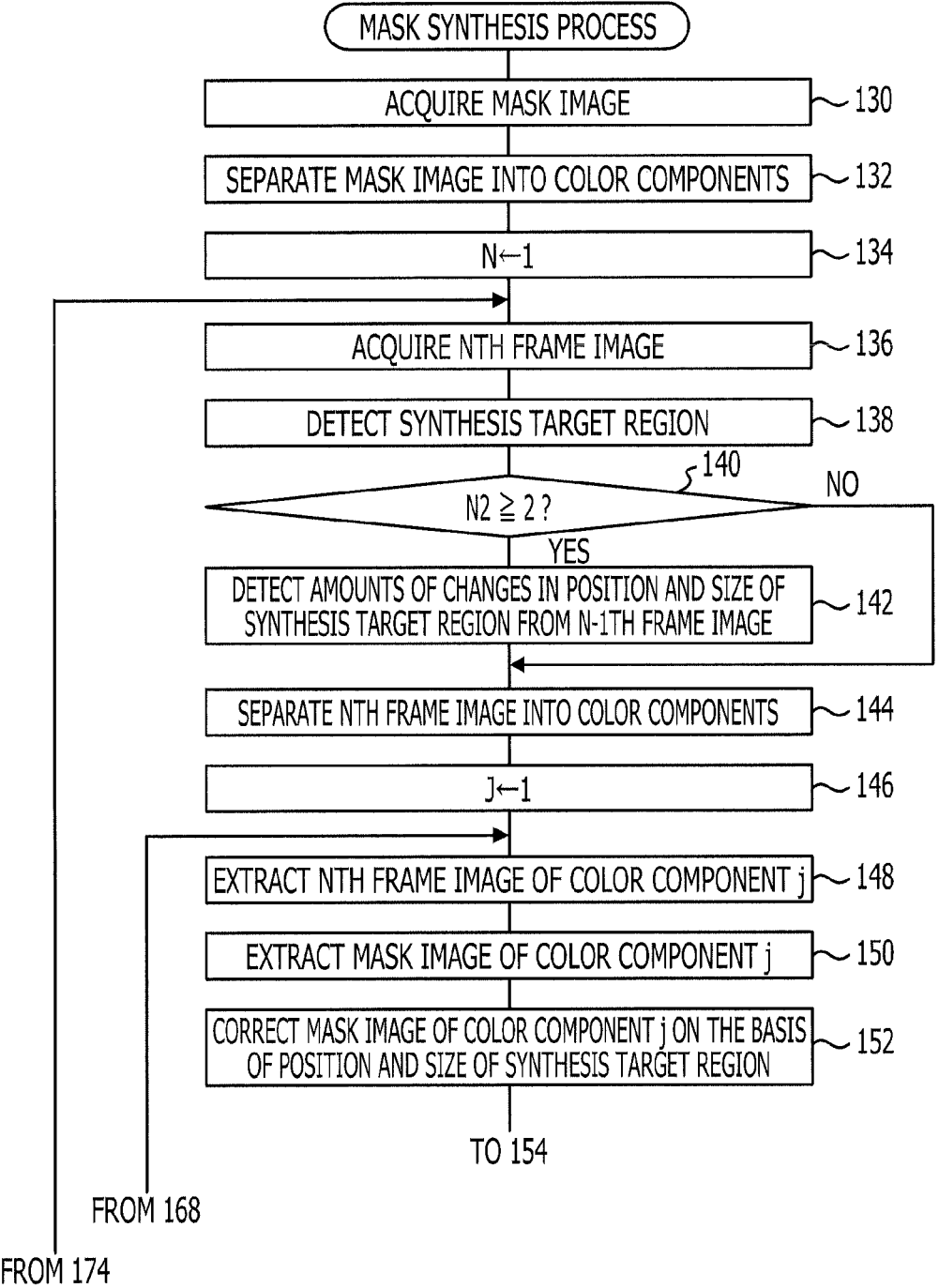

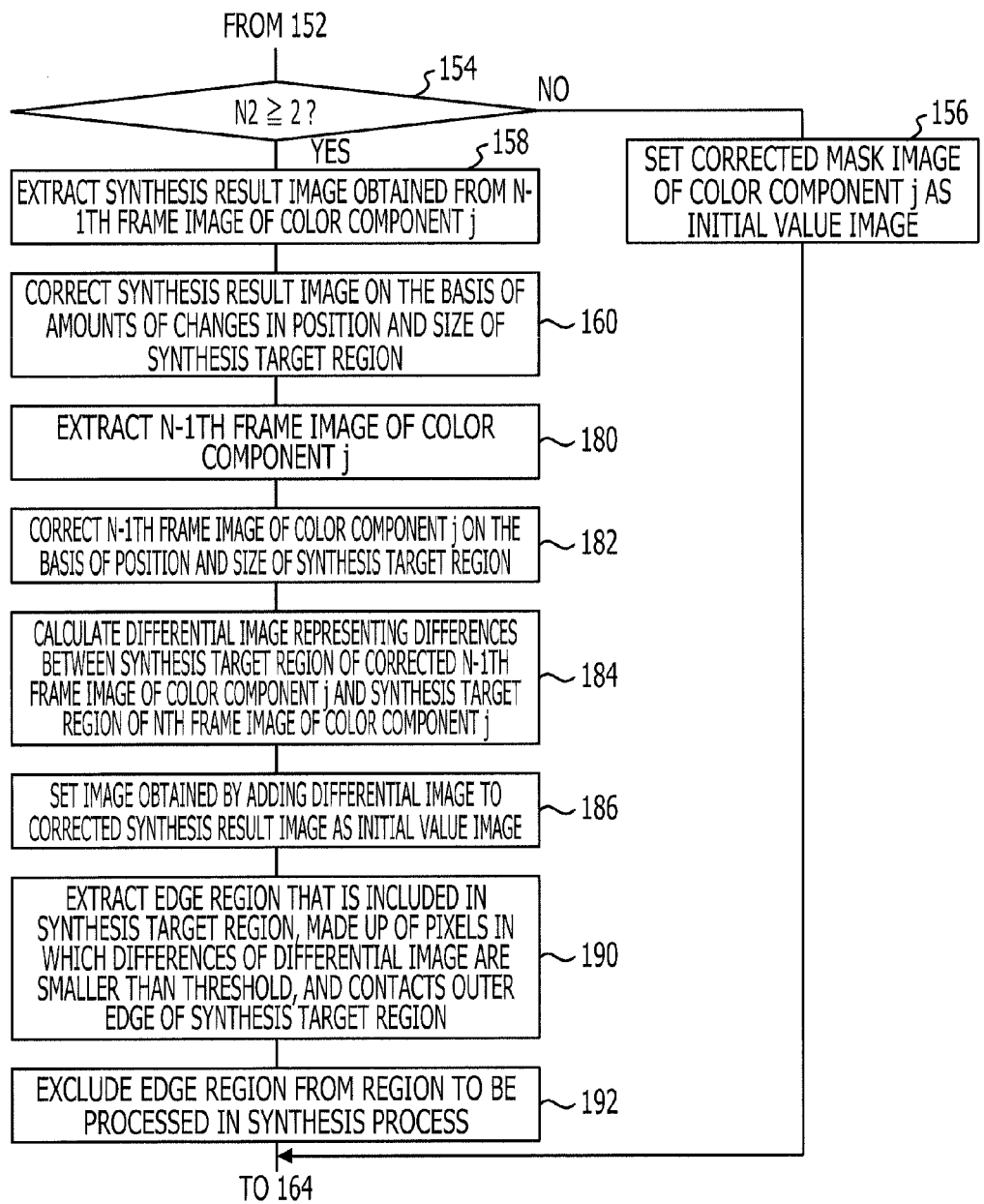

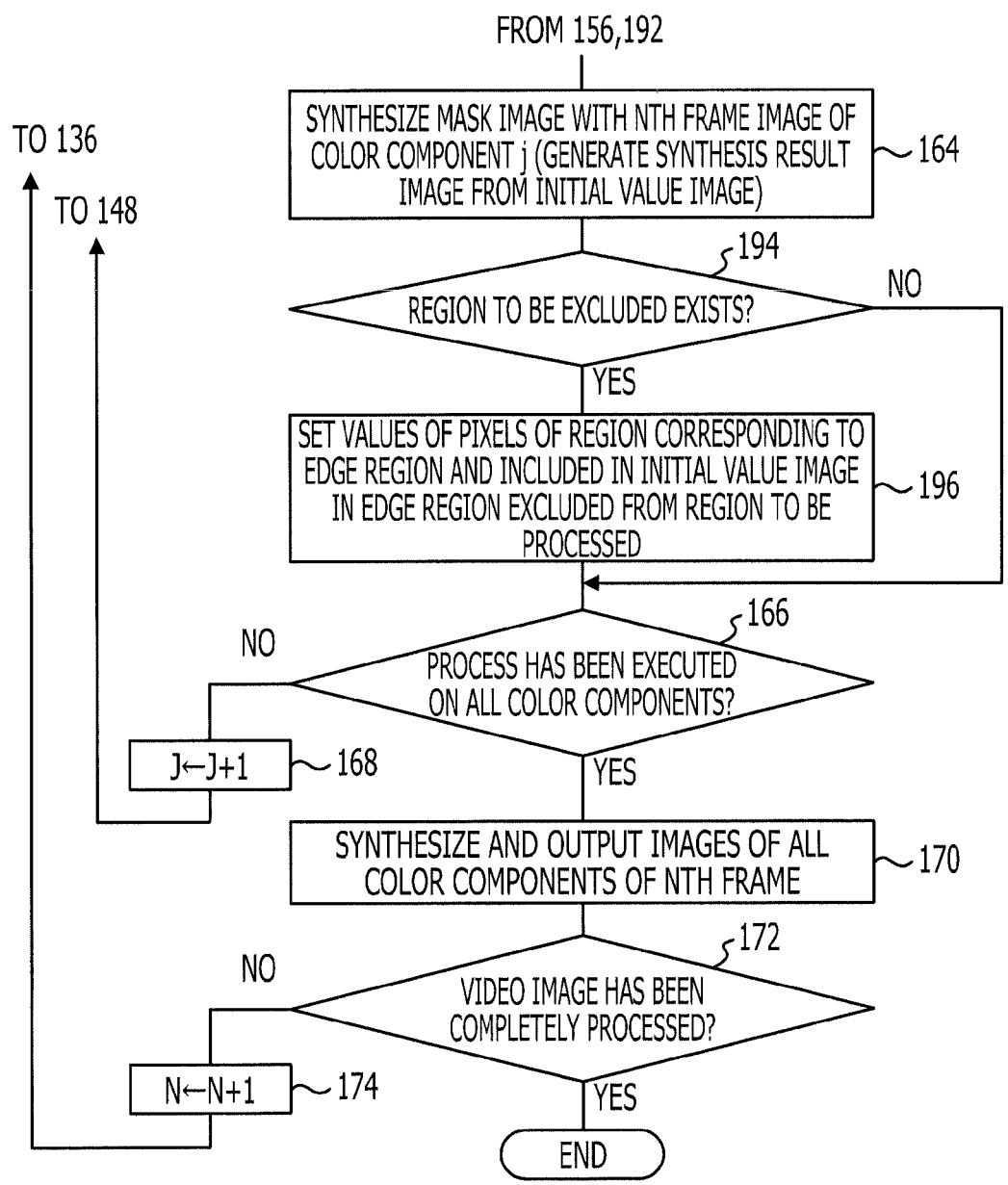

COMPUTER-READABLE STORAGE MEDIUM STORING IMAGE PROCESSING PROGRAM, IMAGE PROCESSING DEVICE AND IMAGE PROCESSING METHOD

CROSS-REFERENCE TO RELATED APPLICATION(S)

This application is based upon and claims the benefit of priority of the prior Japanese Patent Application No. 2012-10168, filed on Jan. 20, 2012, the entire contents of which are incorporated herein by reference.

FIELD

The embodiments discussed herein are related to a computer-readable storage medium storing an image processing program, an image processing device and an image processing method.

BACKGROUND

As a technique for protecting privacy of a person who appears as an object in an image, image processing that is to put a mosaic on a region representing the face of the person in the image in order to inhibit the person from being identified or is to put a rectangular mask on a region representing the eyes of the person is known. It is, however, clear at a glance that the image that is subjected to the image processing has been processed. The image makes an unnatural impression on a person who views the image.

To solve this, Japanese Laid-open Patent Publication No. 2008-204466, "Patrick Perez, Michel Gangnet, Andrew Blake, "Poisson Image Editing", Microsoft Research UK, 2003", and "P. Viola and M. Jones, "Rapid object detection using a boosted cascade of simple features," in Proc. IEEE Computer Vision and Pattern Recognition, pp. I_511-I_518, 2001" have proposed a technique for solving a Poisson's equation using gradient information of a mask image and an edge (synthesis boundary with the mask image) of a synthesis target region such as a facial region included in an image as a boundary requirement and thereby synthesizing the mask image with the synthesis target region. In this technique, an arbitrary initial value image is provided for the synthesized target region, a calculation is repeatedly executed until differences between the initial value image and pixels become values satisfying the gradient information of the mask image and the boundary requirement for the edge, and whereby a synthesis result image that corresponds to a result obtained by synthesizing the mask image with the synthesis target region is generated.

If the synthesis target region is a facial region, an image that represents another person's face and an image that represents the average of faces of people may be used as the mask image. As the initial value image, a whole white image or a whole black image is used.

SUMMARY

According to an aspect of the embodiments, a computer-readable storage medium storing an image processing program that causes a computer to execute a process includes, synthesizing, for each of frames included in a video image and to be processed, a synthesis image with an image of a synthesis target region existing in the frame by repeatedly executing a calculation using a Poisson's equation on the basis of the image of synthesis target region existing in the frame to be processed and the synthesis image to be replaced with the image of the synthesis target region, and thereby calculating, from an initial value image, a synthesis result image corresponding to a result obtained by synthesizing the synthesis image with the synthesis target region so as to sequentially execute a synthesis process on the frames of the video image; and setting, for each of the frames to be processed, initial values by setting, as the initial value image used for the calculation executed in the synthesizing, a synthesis result image calculated from a frame that precedes the frame to be processed and is among the frames of the video image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 7A and FIG. 7B, is a flowchart of an example of a mask synthesis process according to the second embodiment;

FIG. 9 is a functional block diagram illustrating an image processing device according to a third embodiment;

FIG. 10, including FIG. 10A, FIG. 10B and FIG. 10C, is a flowchart of an example of a mask synthesis process according to the third embodiment;

DESCRIPTION OF EMBODIMENTS

Figure 1:
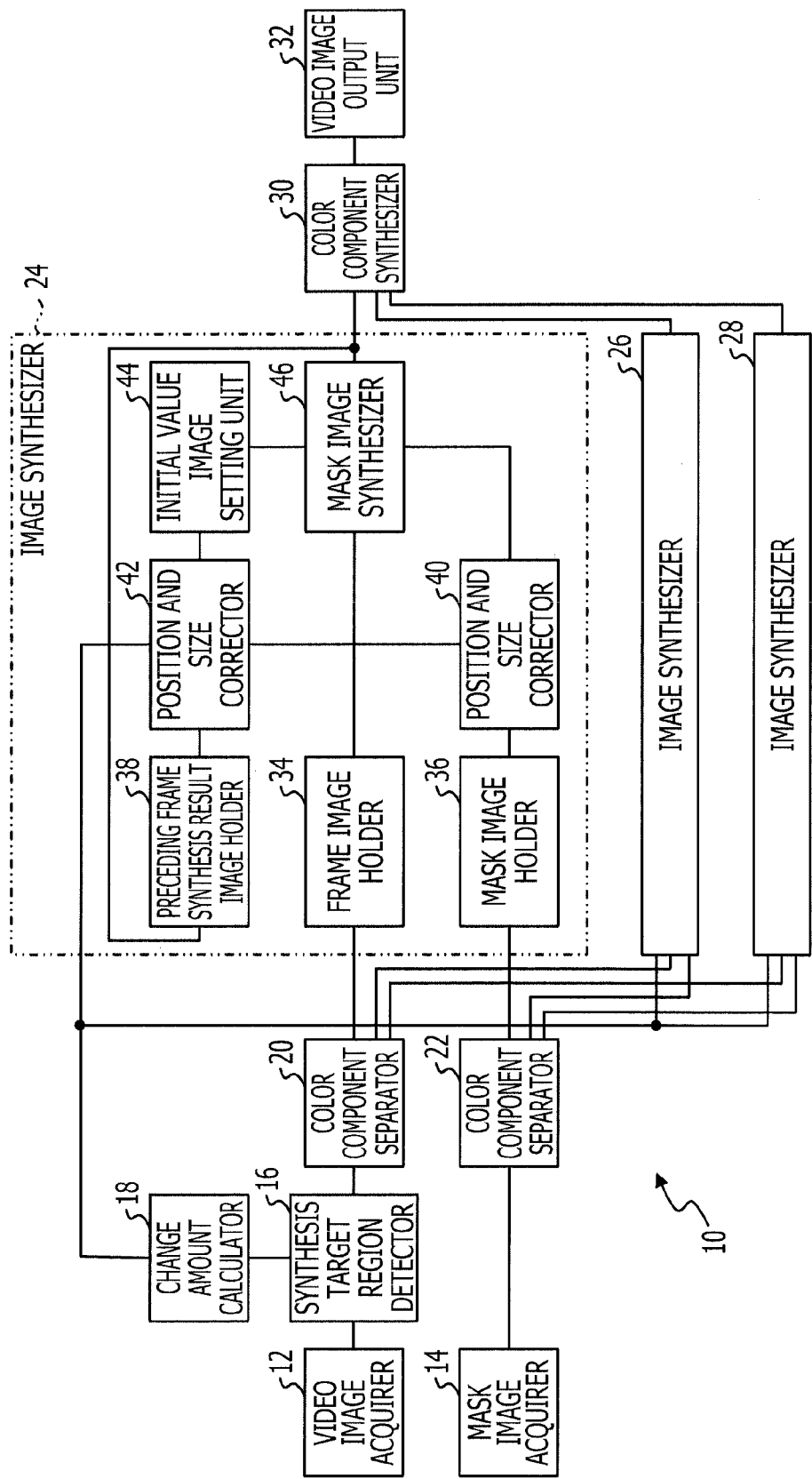
FIG. 1 is a functional block diagram illustrating an image processing device according to a first embodiment.

FIG. 1 illustrates an image processing device 10 according to the first embodiment. The image processing device 10 is a device that executes a mask synthesis process by synthesizing a preset mask image with synthesis target regions (such as regions that represent a person's face and are included in frames of a video image) and thereby protects privacy of the person who appears as an object in the video image. The image processing device 10 includes a video image acquirer 12, a mask image acquirer 14, a synthesis target region detector 16, a change amount calculator 18, two color component separators 20 and 22, three image synthesizers 24, 26 and 28, a color component synthesizer 30 and a video image output unit 32. The image synthesizers 24, 26 and 28 have the same configuration and each include a frame image holder 34, a mask image holder 36, a preceding frame synthesis result image holder 38, two position and size correctors 40 and 42, an initial value image setting unit 44 and a mask image synthesizer 46.

An image has a function of acquiring a video image and images an object. The video image acquirer 12 acquires the video image on a frame basis from the imager or a storage unit that stores the video image. The video image acquirer 12 may include the imager. In addition, the image processing device 10 may be included in the imager. If the imager is connected through a communication cable to an information device that functions as the image processing device 10, the video image acquirer 12 may be a communication unit that is included in the information device and receives image data from the imager through the communication cable.

The mask image acquirer 14 acquires a mask image to be synthesized with synthesis target regions such as regions that represent a person's face and are included in frames of a video image. As described above, the mask synthesis process according to the present embodiment is executed for the purpose of protecting privacy of a person who appears as an object in a video image. The mask image is preset so as to cause identification of the person appearing in the video image synthesized with the mask image to be difficult. For example, if the synthesis target regions are regions that represent a person's face, an image of a person's face other than the person appearing as the object in the video image, an image of the average of faces of people, or the like is preset as the mask image. The mask image acquirer 14 reads the preset mask image stored in the storage unit and acquires the mask image.

The synthesis target region detector 16 sequentially detects the synthesis target regions that are included in images of the frames of the video image acquired by the video image acquirer 12. The synthesis target region detector 16 sequentially outputs information of the positions and sizes of the detected synthesis target regions on the images to the change amount calculator 18. The change amount calculator 18 calculates the amounts of changes in the positions and sizes of the synthesis target regions from preceding frames on the basis of the positions and sizes of the synthesis target regions input on a frame basis from the synthesis target region detector 16. The synthesis target region detector 16 and the change amount calculator 18 are an example of a detector included in techniques disclosed herein. The processes that are achieved by the synthesis target region detector 16 and the change amount calculator 18 are an example of a detection step included in the techniques disclosed herein.

The color component separator 20 separates each of the images of the frames of the video image acquired by the video image acquirer 12 into a plurality of color components for each of pixels. The color component separator 22 separates the mask image acquired by the mask image acquirer 14 into a plurality of color components for each of pixels. As the color components, color components that define an arbitrary color space may be used. For example, any of an RGB color space, a YUV color space and an L*a*b* color space may be used.

The image synthesizers 24, 26 and 28 correspond to different color components, respectively, and receive frame images of the different color components from the color component separators 20 and 22. The image synthesizers 24, 26 and 28 execute processes of synthesizing the received mask image with the synthesis target regions included in the received frame images of the different color components.

Specifically, the frame image holder 34 receives a frame image, to be processed, of a specific color component from the color component separator 20 and holds the frame image of the specific color component. The mask image holder 36 receives a mask image of the specific color component from the color component separator 22 and holds the mask image of the specific color component. The preceding frame synthesis result image holder 38 holds a synthesis result image (that is a result obtained by synthesizing the mask image with a frame image preceding the frame image to be processed) of the specific color component.

The position and size corrector 40 corrects the position and size of the mask image of the specific color component on the basis of the position and size of the synthesis target region detected from the frame image (to be processed) by the synthesis target region detector 16 so that the position and size of the synthesis target region match the position and size of the mask image held by the mask image holder 36. In addition, the position and size corrector 42 corrects the position and size of the synthesis result image, held by the preceding frame synthesis result image holder 36, of the specific color component on the basis of the amounts (of the changes in the position and size of the synthesis target region) calculated by the change amount calculator 18 for the frame image to be processed. The position and size correctors 40 and 42 are an example of a corrector included in the techniques disclosed herein. The processes that are achieved by the position and size correctors 40 and 42 are an example of a correction step included in the techniques disclosed herein.

The initial value image setting unit 44 sets, as an initial value image, the synthesis result image (of the specific color component) that has been obtained from the preceding frame image and corrected by the position and size corrector 42. The initial value image setting unit 44 is an example of an initial value setting unit included in the techniques disclosed herein. The process that is achieved by the initial value image setting unit 44 is an example of an initial value setting step included in the techniques disclosed herein.

The mask image synthesizer 46 synthesizes the frame image (to be processed) with the mask image on the basis of the frame image held by the frame image holder 34 and to be processed, the mask image held by the mask image holder 36 and the initial value image set by the initial value image setting unit 44. The synthesis of the mask image (generation of the synthesis result image) is achieved by a calculation repeatedly executed using a Poisson's equation and is described later in detail. The mask image synthesizer 46 is an example of a synthesizer included in the techniques disclosed herein. The process that is achieved by the mask image synthesizer 46 is an example of a synthesis step included in the techniques disclosed herein.

When frame images, synthesized with the mask image, of the different color components are output from the image synthesizers 24, 26 and 28, the color component synthesizer 30 synthesizes the frame images, output from the image synthesizers 24, 26 and 28, of the different color components so as to form a single frame image and outputs the single frame image. The video image output unit 32 outputs the single frame image output from the color component synthesizer 30 as a single frame image synthesized with the mask image and included in the video image.

Figure 2:
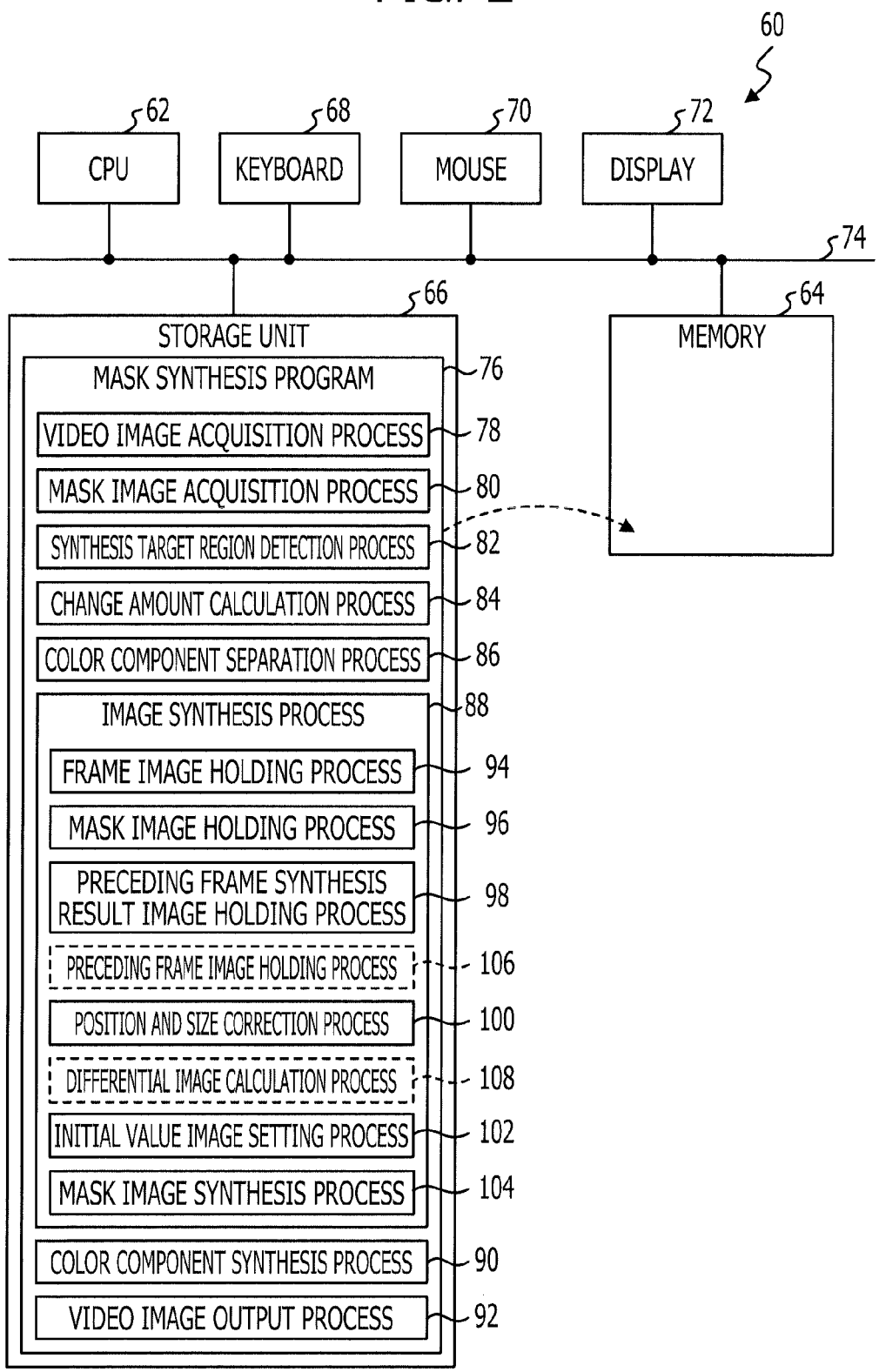
FIG. 2 is an outline block diagram illustrating a computer that functions as the image processing device.

The image processing device 10 may be achieved by a computer 50 illustrated in FIG. 2, for example. The computer 60 includes a CPU 62, a memory 64, a nonvolatile storage unit 66, a keyboard 68, a mouse 70 and a display 72, which are connected to each other through a bus 74.

The storage unit 66 may be achieved by a hard disk drive (HDD), a flash memory or the like. A mask synthesis program 76 that enables the computer 60 to function as the image processing device 10 is stored in the storage unit 66 that serves as a storage medium. The CPU 62 reads the mask synthesis program 76 from the storage unit 66, loads the mask synthesis program 76 into the memory 64 and sequentially executes the following processes that are included in the mask synthesis program 76.

The mask synthesis program 76 includes a video image acquisition process 78, a mask image acquisition process 80, a synthesis target region detection process 82, a change amount calculation process 84, a color component separation process 86, an image synthesis process 88, a color component synthesis process 90 and a video image output process 92. The CPU 62 executes the video image acquisition process 78 and thereby operates as the video image acquirer 12 illustrated in FIG. 1. The CPU 62 executes the mask image acquisition process 80 and thereby operates as the mask image acquirer 14 illustrated in FIG. 1. The CPU 62 executes the synthesis target region detection process 82 and thereby operates as the synthesis target region detector 16 illustrated in FIG. 1. The CPU 62 executes the change amount calculation process 84 and thereby operates as the change amount calculator 18 illustrated in FIG. 1. The CPU 62 executes the color component separation process 86 and thereby operates as the color component separators 20 and 22 illustrated in FIG. 1. The CPU 62 executes the image synthesis process 88 and thereby operates as the image synthesizers 24, 26 and 28 illustrated in FIG. 1. The CPU 62 executes the color component synthesis process 90 and thereby operates as the color component synthesizer 30 illustrated in FIG. 1. The CPU 62 executes the video image output process 92 and thereby operates as the video image output unit 32 illustrated in FIG. 1.

The image synthesis process 88 includes a frame image holding process 94, a mask image holding process 96, a preceding frame synthesis result image holding process 98, a position and size correction process 100, an initial value image setting process 102 and a mask image synthesis process 104. The CPU 62 executes the frame image holding process 94 and thereby operates as the frame image holder 34 illustrated in FIG. 1. The CPU 62 executes the mask image holding process 96 and thereby operates as the mask image holder 36 illustrated in FIG. 1. The CPU 62 executes the preceding frame synthesis result image holding process 98 and thereby operates as the preceding frame synthesis result image holder 38 illustrated in FIG. 1. The CPU 62 executes the position and size correction process 100 and thereby operates as the position and size correctors 40 and 42 illustrated in FIG. 1. The CPU 62 executes the initial value image setting process 102 and thereby operates as the initial value image setting unit 44 illustrated in FIG. 1. The CPU 62 executes the mask image synthesis process 104 and thereby operates as the mask image synthesizer 46 illustrated in FIG. 1.

The computer 60 executes the mask synthesis program 76 and thereby functions as the image processing device 10. The mask synthesis program 76 is an example of an image processing program included in the techniques disclosed therein.

The image processing device 10 may be achieved by a semiconductor integrated circuit such as an application specific integrated circuit (ASIC), for example.

Figures 3, 3A, 3B:
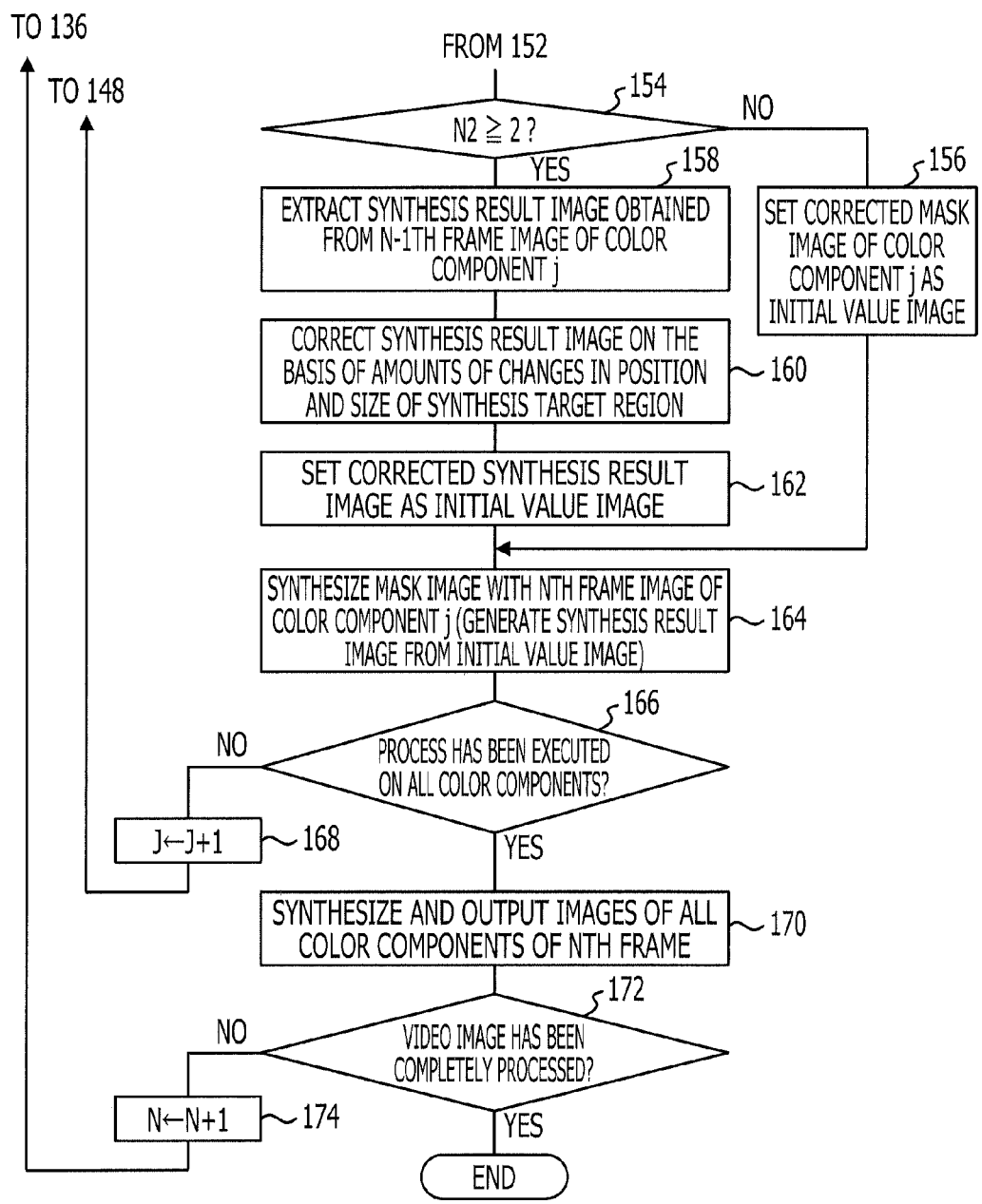
FIG. 3, including
FIG. 3A and FIG. 3B, is a flowchart of an example of a mask synthesis process according to the first embodiment.

Next, effects of the first embodiment are described. If privacy of a person who appears as an object in a video image is to be protected in order to distribute or broadcast the video image acquired by the imager, or post the video image on a network or the like, the image processing device 10 is instructed to execute the mask synthesis process. Before the mask synthesis process, the video image to be processed and a mask image to be synthesized are specified. Then, the image processing device 10 according to the first embodiment executes the mask synthesis process illustrated in FIG. 3.

Figure 5:
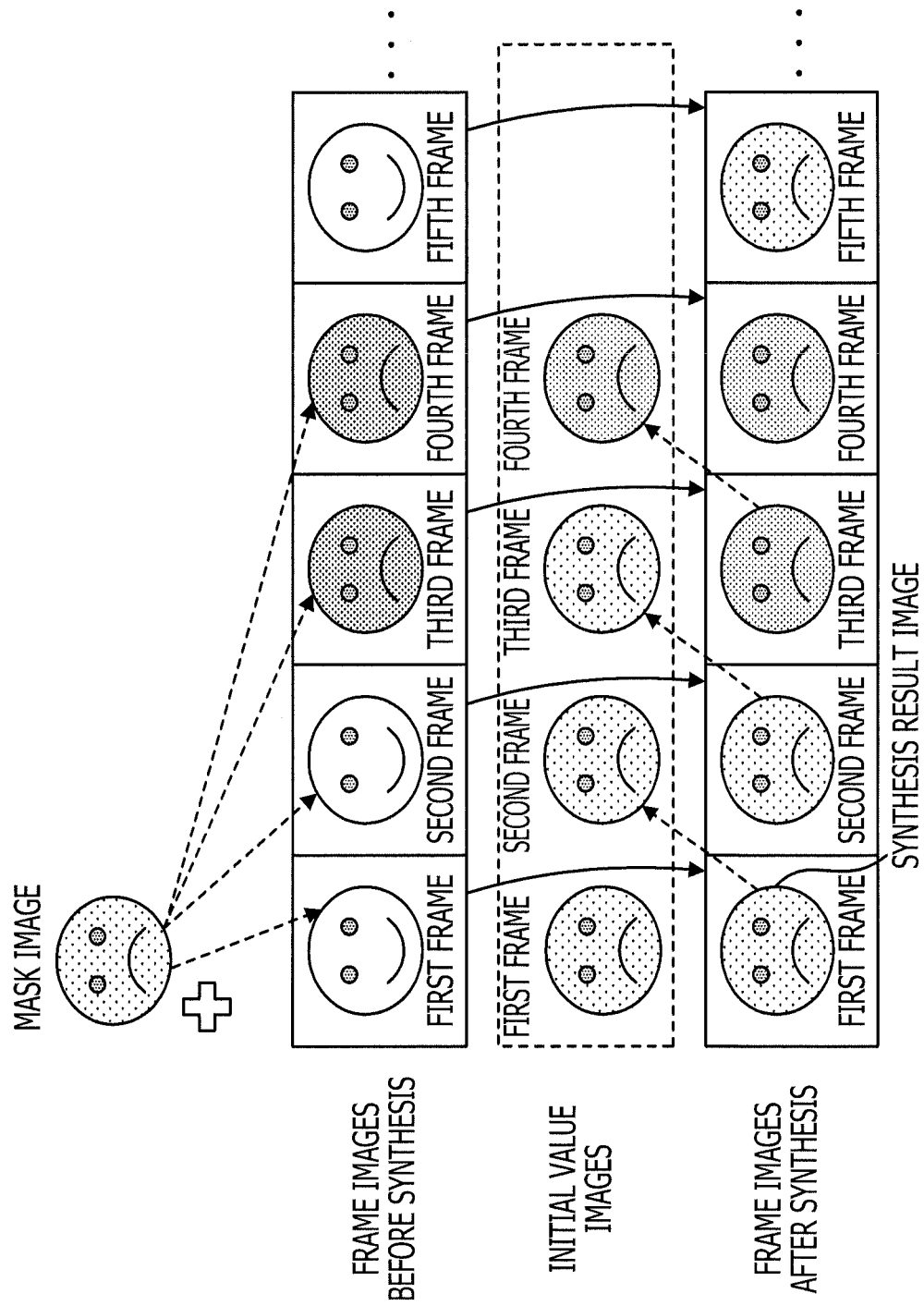
FIG. 5 is an outline diagram describing setting of an initial value image according to the first embodiment.

In step 130 of the mask synthesis process, the mask image acquirer 14 selects, from among a plurality of mask images stored in the storage unit 66 or the like, a mask image specified as a mask image to be synthesized, and acquires the selected mask image. If a region that is included in the video image and represents the whole face of the person who appears as an object in the video image is used as a synthesis target region to be synthesized with the mask image, a facial image that represents a person's face (face of another person, the average of faces of people, or the like) is used as the mask image, as illustrated in FIG. 5, for example. In step 132, the color component separator 22 separates the mask image acquired by the mask image acquirer 14 into a plurality of color components. Mask images, obtained by the color component separator 22, of the color components are held by the mask image holders 36 of the image synthesizers 24, 26 and 28, respectively.

In step 134, the video image acquirer 12 sets a variable N to 1. The variable N identifies a frame of the video image specified as a video image to be processed. In step 136, the video image acquirer 12 acquires an Nth frame image of the video image to be processed. In step 138, the synthesis target region detector 16 detects a synthesis target region from the Nth frame image acquired by the video image acquirer 12 and detects the position and size of the synthesis target region of the Nth frame image.

If a facial region is used as the synthesis target region, an arbitrary method such as a method (refer to "P. Viola and M. Jones, "Rapid object detection using a boosted cascade of simple features," in Proc. IEEE Computer Vision and Pattern Recognition, pp. I_511-I_518, 2001") using a haar classifier may be used for the detection of the facial region. The synthesis target region is not limited to a region to be detected by the synthesis target region detector 16. For example, if the mask image is to be synthesized only for some of people who appear as objects in the video image, a synthesis target region that is to be processed and synthesized and represents the some of the people may be first specified. In this case, the synthesis target region detector 16 may execute a process of tracing the first specified synthesis target region on the video image.

In the next step 140, the change amount calculator 18 determines whether or not the variable N is 2 or more. Since the variable N is 1 at this time, the answer to the determination of step 140 is negative and the mask synthesis process proceeds to step 144. In step 144, the color component separator 20 separates the Nth frame image acquired by the video image acquirer 12 into a plurality of color components. Nth frame images, obtained by the color component separator 20, of the color components are held by the frame image holders 34 of the image synthesizers 24, 26 and 28, respectively.

In the next step 146, any of the image synthesizers 24, 26 and 28 sets a variable j to 1, while the variable j identifies a color component. In step 148, the mask image synthesizer 46 of an image synthesizer that is among the image synthesizers 24, 26 and 28 and corresponds to the color component j extracts the Nth frame image of the color component j from the frame image holder 34. In step 150, the position and size corrector 40 extracts a mask image of the color component j from the mask image holder 36. In step 152, the position and size corrector 40 corrects the position and size of the mask image, extracted in step 148, of the color component j so that the position and size of the mask image of the color component j match the position and size of the synthesis target region detected by the synthesis target region detector 16.

In the next step 154, the initial value image setting unit 44 determines whether or not the variable N is 2 or more. Since the variable N is 1 at this time, the answer to the determination of step 154 is negative and the mask synthesis process proceeds to step 156. In step 156, the initial value image setting unit 44 sets the mask image (of the color component j) whose position and size have been corrected by the position and size corrector 40 as an initial value image to be used to synthesize the mask image of the color component j with the Nth frame image of the color component j. After step 156, the mask synthesis process proceeds to step 164.

Figure 4:
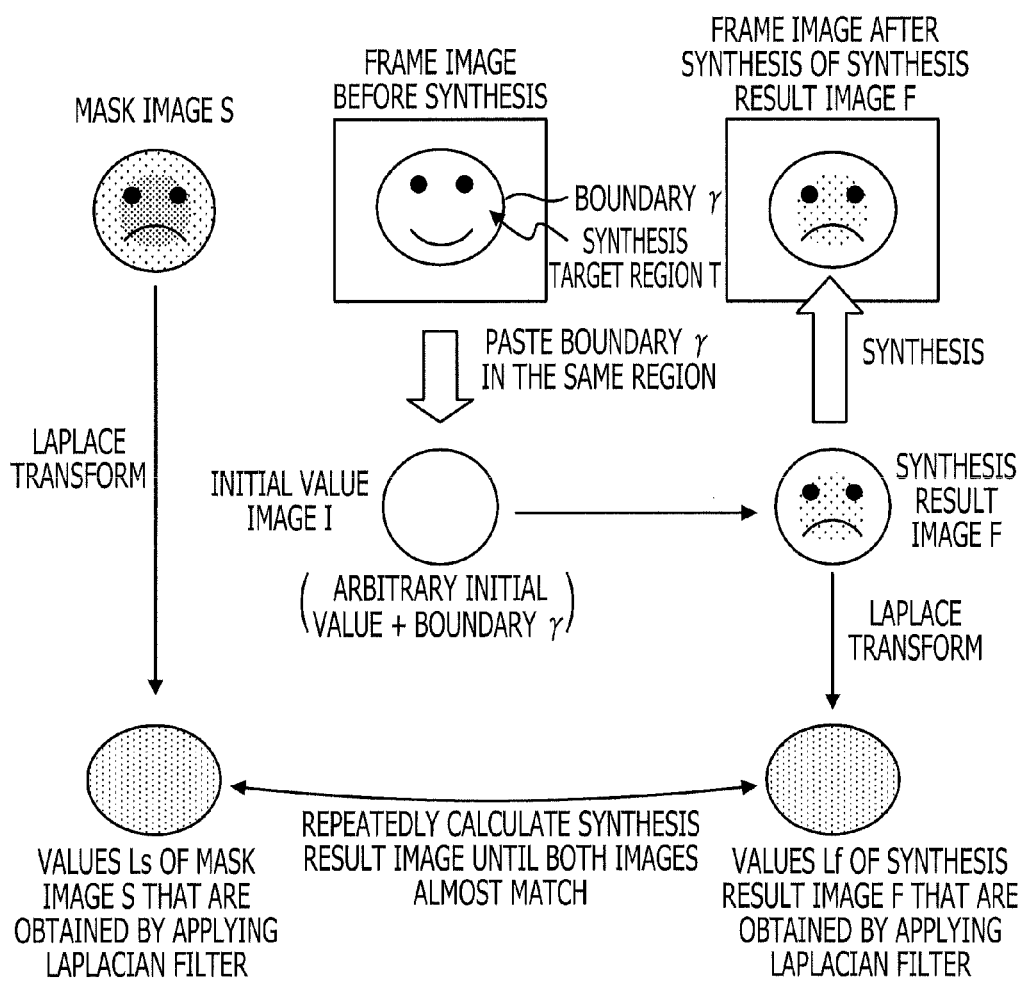
FIG. 4 is an outline diagram describing that a mask image is synthesized using a Poisson's equation.

In step 164, the mask image synthesizer 46 executes a mask image synthesis process so as to synthesize the mask image of the color component j with the Nth frame image of the color component j. The mask image synthesis process that is executed by the mask image synthesizer 46 is a process of solving the Poisson's equation using gradient information of the mask image and an edge (synthesis boundary between the synthesis target region and the mask image) of the synthesis target region as a boundary requirement and calculating a synthesis result image. Specifically, the mask image synthesis process is achieved by the following calculation process (refer to FIG. 4).

When the mask image is indicated by S (width, height), the synthesis target region is indicated by T (width, height), the initial value image is indicated by I (width, height) and the synthesis result image is indicated by F (width, height), values Ls of the mask image S that are obtained by applying a Laplacian filter to the mask image S are expressed by the following Equation (1).

$$Ls(x,y) = S(x-1,y) + S(x+1,y) + S(x,y-1) + S(x,y+1) + 4S(x,y) \quad (1)$$

Ends of the image, however, are not calculated. Thus, when the width of the mask image is indicated by W and the height of the mask image is indicated by H, $0 < x < W-1$, and $0 < y < H-1$. Outer edges of the image are regarded as pixel values (boundary $\gamma$) of the synthesis target region (refer to the following Equation (2)).

$$F(x,y) = T(x,y) \text{ (when } x=0, y=0, x=W-1, \text{ or } y=H-1) \quad (2)$$

In addition, values Lf of the synthesis result image F that are obtained by applying the Laplacian filter to the synthesis result image F match the values Ls of the mask image S that are obtained by applying the Laplacian filter to the mask image S (refer to the following Equation (3)).

$$Lf(x,y) = Ls(x,y) \quad (3)$$

By solving Equations (2) and (3), values of the synthesis result image F (x, y) may be obtained from the whole synthesis target region T.

Equations (2) and (3) may be solved as follows. The values Lf of the synthesis result image F that are obtained by applying the Laplacian filter to the are expressed by the following Equation (4).

$$Lf(x,y) = F(x-1,y) + F(x+1,y) + F(x,y-1) + F(x,y+1) + 4F(x,y) \quad (4)$$

The following Equation (5) is obtained from Equation (3).

$$F(x,y) = \{F(x-1,y) + F(x+1,y) + F(x,y-1) + F(x,y+1) - Ls(x,y)\}/4 \quad (5)$$

In order to numerically solve the synthesis result image F, Equation (5) is changed to Recurrence Equation (6). After initial values are added to the synthesis result image F, a calculation is repeatedly executed until values of the synthesis result image F converge to certain values (Gauss-Seidel method).

$$Fi+1(x,y) = \{(Fi(x-1,y) + Fi(x+1,y) + Fi(x,y-1) + Fi(x,y+1) - Ls(x,y)\}/4 \quad (6)$$

A symbol i is a variable that identifies the number of times when the calculation is repeatedly executed. Normally, the initial values $F0(x, y) = T(x, y)$ (when $x=0, y=0, x=W-1$, or $y=H-1$), and $F0(x, y) = 0$ (unless $x=0, y=0, x=W-1$, and $y=H-1$). In the present embodiment, the initial value image set by the initial value image setting unit 44 is used (refer to the following Equation (7)).

$$F0(x,y) = T(x,y) \text{ (when } x=0, y=0, x=W-1, \text{ or } y=H-1),$$
$$\text{and } F0(x,y) = I(x,y) \text{ (unless } x=0, y=0, x=W-1, \text{ and } y=H-1) \quad (7)$$

A requirement for the convergence is any of the following convergence requirements A and B. The convergence requirement A is that |Fi+1−Fi| is equal to or lower than a threshold. The convergence requirement B is that |Lf−Ls| is equal to or lower than a threshold, while the values Lf of the synthesis result image F are obtained by applying the Laplacian filter to the synthesis result image F. The synthesis result image F is generated from the boundary $\gamma$ between the initial value image I and the synthesis target region T on the basis of the mask image S.

The synthesis result image F may be calculated according to the following Equation (8) (SOR method) instead of Equation (6).

$$Fi+1(x,y) = (1-\omega)Fi(x,y) + \omega\{(Fi(x-1,y) + Fi(x+1,y) + Fi(x,y-1) + Fi(x,y+1) - Ls(x,y)\}/4 \quad (8)$$

When $\omega$ is in a range of 1 to 2, values of Fi+1(x, y) expressed by Equation (8) converges to certain values. When $\omega$ is 1, the aforementioned Equation (6) may be regarded as Equation (8). When $\omega$ is approximately 1.95, excellent convergence may be obtained.

As described above, when the variable N is 1, the mask image S is used as initial values of the synthesis result image F synthesized in the mask synthesis process. The mask image S is more similar to the synthesis result image F that is finally obtained than a whole white image (F0(x, y)=0) that is general initial values. Thus, satisfying the convergence requirement reduces the number of times of the calculation repeated until the lastly repeated calculation of the mask image synthesis process is completed (the amount of data to be calculated is reduced), and the mask image synthesis process may be completed for a short time.

When the synthesis result image F of the color component j is generated in the aforementioned manner, the mask image synthesizer 46 pastes the generated synthesis result image F of the color component j on the synthesis target region of the Nth frame image of the color component j. Thus, the Nth frame image of the color component j, in which a synthesis boundary with the synthesized mask image (synthesis result image F) is unnoticeable, is obtained and looks natural.

After the mask image synthesis process is executed on the Nth frame image of the color component j by the mask image synthesizer 46, the mask synthesis process proceeds to step 166. In step 166, any of the image synthesizers 24, 26 and 28 determines whether or not the mask image synthesis process has been executed on all the color components of the Nth frame. If the answer to the determination of step 166 is negative, the mask synthesis process proceeds to step 168. In step 168, any of the image synthesizers 24, 26 and 28 increments the variable j by 1. After step 168, the mask synthesis process returns to step 148. Until the answer to the determination of step 166 becomes positive, steps 148 to 168 are repeated to execute the mask image synthesis process on all the color components of the Nth frame.

If the answer to the determination of step 166 is positive, the mask synthesis process proceeds to step 170. In step 170, the color component synthesizer 30 synthesizes images (images on which the synthesis result image F is pasted) of all the color components of the Nth frame so as to form a single image, and the video image output unit 32 outputs the image formed by the color component synthesizer 30 as the Nth frame image that has been synthesized with the mask image and is included in the video image.

In the next step 172, the video image acquirer 12 determines whether or not to terminate the mask synthesis process by determining whether or not the video image acquirer 12 has acquired all frame images of the video image to be processed. If the answer to the determination of step 172 is negative, the mask synthesis process proceeds to step 174 and the video image acquirer 12 increments the variable N by 1 in step 174. Then, the mask synthesis process returns to step 136. Until the answer to the determination of step 172 becomes positive, steps 136 to 174 are repeated.

When the variable N is incremented and thereby becomes 2 or more, the answer to the determination of the aforementioned step 140 becomes positive and the mask synthesis process proceeds to step 142. In step 142, the change amount calculator 18 calculates the amounts of changes in the position and size of the synthesis target region of the Nth frame image from the N−1th frame image on the basis of the position and size of the synthesis target region detected by the synthesis target region detector 16 and included in the Nth frame image. After step 142, the mask synthesis process proceeds to step 144.

When the variable N becomes 2 or more, the answer to the determination of step 154 is positive and the mask synthesis process proceeds to step 158. In step 158, the preceding frame synthesis result image holder 38 acquires a synthesis result image F calculated from the N−1th frame image of the color component j and temporarily holds the acquired synthesis result image F.

In the next step 160, the position and size corrector 42 corrects the synthesis result image F calculated from the N−1th frame image of the color component j and held by the preceding frame synthesis result image holder 38 on the basis of the amounts, calculated by the change amount calculator 18, of changes in the position and size of the synthesis target region. In this case, the synthesis result image F calculated from the N−1th frame image of the color component j is corrected so that the position and size of the synthesis result image F calculated from the N−1th frame image of the color component j match the position and size of the synthesis target region detected by the synthesis target region detector 16 and included in the Nth frame image. In step 162, the initial value image setting unit 44 sets the synthesis result image F calculated from the N−1th frame image of the color component j and corrected by the position and size corrector 42 as the initial value image I.

A change in the luminance or the like of boundaries γ of synthesis target regions of continuous frames of the video image is small, and synthesis result images F that are finally obtained from those synthesis target regions in the mask image synthesis process are similar to each other. These features are used in the present embodiment. When the variable N≥2, the synthesis result image F synthesized with the N−1th frame image (preceding frame image) is used as the initial values (initial value image I) of the synthesis result image F obtained from the Nth frame image in the mask image synthesis process as illustrated in FIG. 5 in the present embodiment.

Thus, the initial value image I is more similar to the synthesis result image F finally obtained in the mask image synthesis process, compared with the case where the mask image S is used as the initial value image I. Satisfying the convergence requirement reduces the number of times of the calculation repeated until the lastly repeated calculation of the mask image synthesis process is completed (the amount of data to be calculated is reduced). Thus, the mask image synthesis process is completed for a short time. In the first embodiment, the initial value image I is similar to the synthesis result image F finally obtained in the mask image synthesis process, and whereby the amount of data to be calculated is reduced. The quality of the finally obtained synthesis result image F is not reduced.

Steps 136 to 174 are repeated until the answer to the determination of step 172 becomes positive. Thus, the video image output unit 32 sequentially outputs the video image in which the mask image has been synthesized with the synthesis target regions included in the frames. The video image output from the video image output unit 32 has regions in which the mask image has been synthesized with the synthesis target regions such as regions that represent the face of a person who appears as an object in the video image. Thus, even when the video image is viewed, it is difficult to identify the person. The privacy of the person, therefore, may be protected.

The second embodiment of the techniques disclosed herein is described below. Parts that are the same as those described in the first embodiment are indicated by the same reference numerals as those described in the first embodiment. Only differences between the first and second embodiments are described below.

Figure 6:
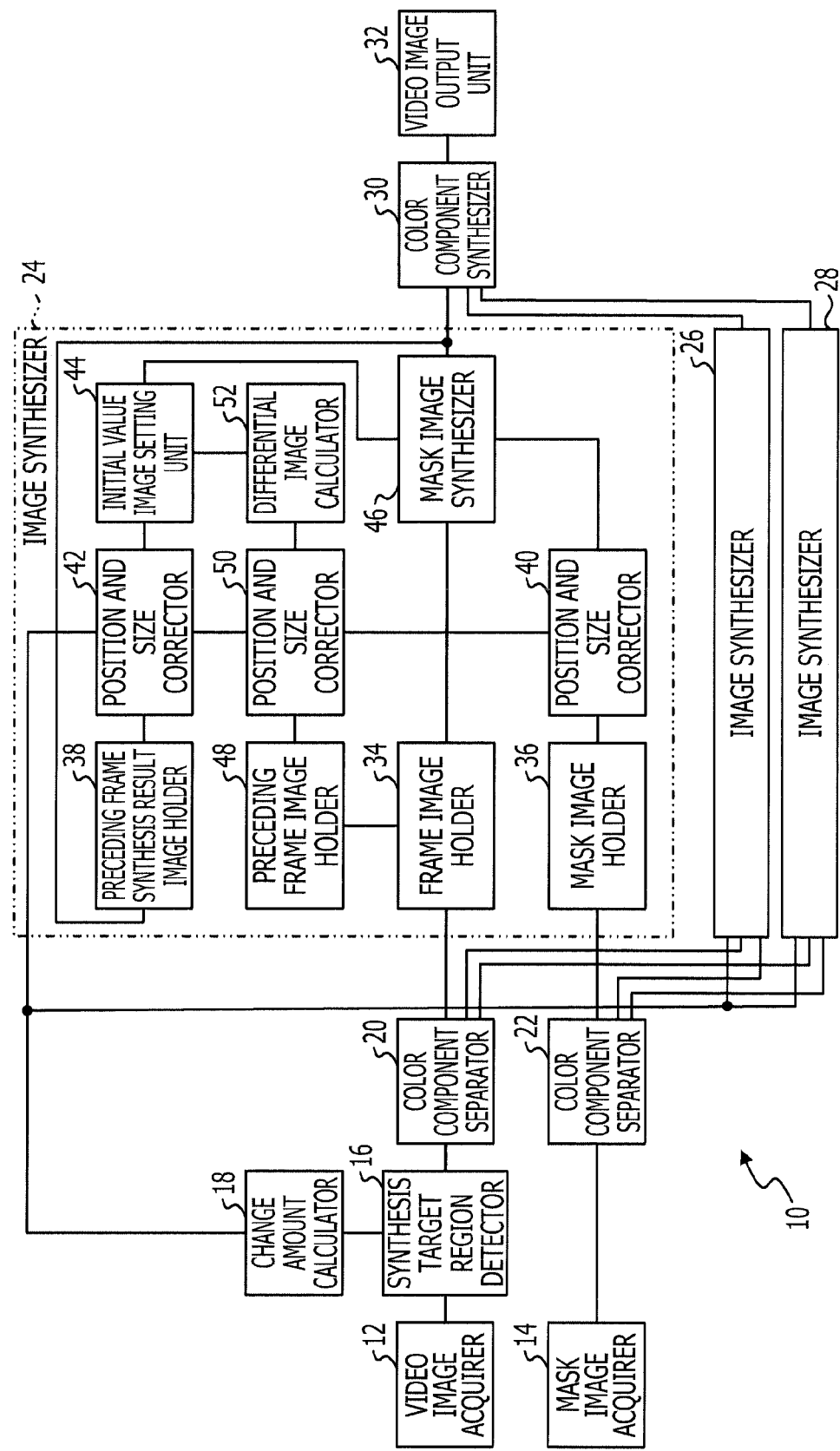
FIG. 6 is a functional block diagram illustrating an image processing device according to a second embodiment.

FIG. 6 illustrates an image processing device 10 according to the second embodiment. In the image processing device 10 according to the second embodiment, the image synthesizer 24 further includes a preceding frame image holder 48, a position and size corrector 50 and a differential image calculator 52. The preceding frame image holder 48 holds a frame image that precedes a frame image to be processed. The position and size corrector 50 corrects the position and size of a frame image, held by the preceding frame image holder 48, of a specific color component on the basis of the amounts of changes in the position and size of a synthesis target region of the frame image to be processed, while the amounts of the changes have been calculated by the change amount calculator 18.

The differential image calculator 52 calculates the difference between the frame image to be processed and the frame image preceding the frame image to be processed for each of pixels so as to form a differential image and outputs the differential image formed by the calculation to the initial value image setting unit 44. The differential image calculator 52 is an example of a difference calculator included in the techniques disclosed herein. The process that is achieved by the differential image calculator 52 is an example of a difference calculation step included in the techniques disclosed herein.

In the second embodiment, the image synthesis process 88 of the mask synthesis program 76 further includes a preceding frame image holding process 106 and a differential image calculation process 108, as indicated by broken lines illustrated in FIG. 2. In the second embodiment, the CPU 62 executes the preceding frame image holding process 106 and thereby operates as the preceding frame image holder 48 illustrated in FIG. 6. In the second embodiment, the CPU 62 executes the position and size correction process 100 and thereby operates as the position and size correctors 40, 42 and 50. In the second embodiment, the CPU 62 executes the differential image calculation process 108 and thereby operates as the differential image calculator 52 illustrated in FIG. 6.

Figure 7:
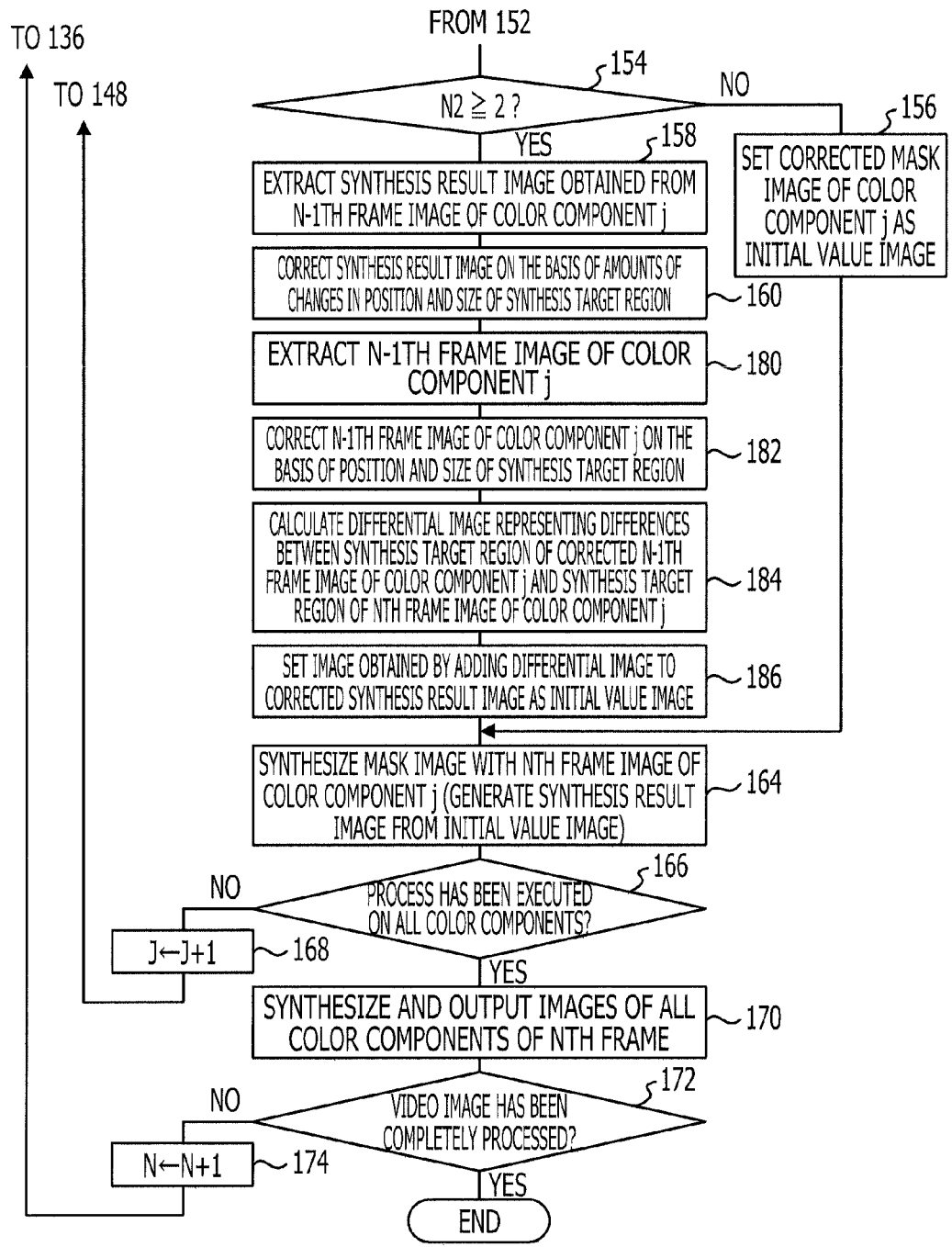
FIG. 7, including

With reference to FIG. 7, as effects of the second embodiment, only differences between a mask synthesis process according to the second embodiment and the mask synthesis process (illustrated in FIG. 3) according to the first embodiment are described.

In the mask synthesis process according to the second embodiment, when the answer to the determination of step 154 is positive, the synthesis result image F synthesized with the N−1th frame image of the color component j is acquired in step 158 and corrected in step 160. After step 160, the mask synthesis process proceeds to step 180. In step 180, the preceding frame image holder 48 acquires the N−1th frame image (image preceding the frame image to be processed) of the color component j and temporarily holds the acquired frame image.

In the next step 182, the position and size corrector 50 corrects the N−1th frame image, held by the preceding frame image holder 48, of the color image j on the basis of the amounts, calculated by the change amount calculator 18, of changes in the position and size of the synthesis target region. Thus, the position and size of the synthesis target region included in the N−1th frame image of the color component j are corrected so as to match the position and size of the synthesis target region, detected by the synthesis target region detector 16, of the Nth frame image.

Figure 8:
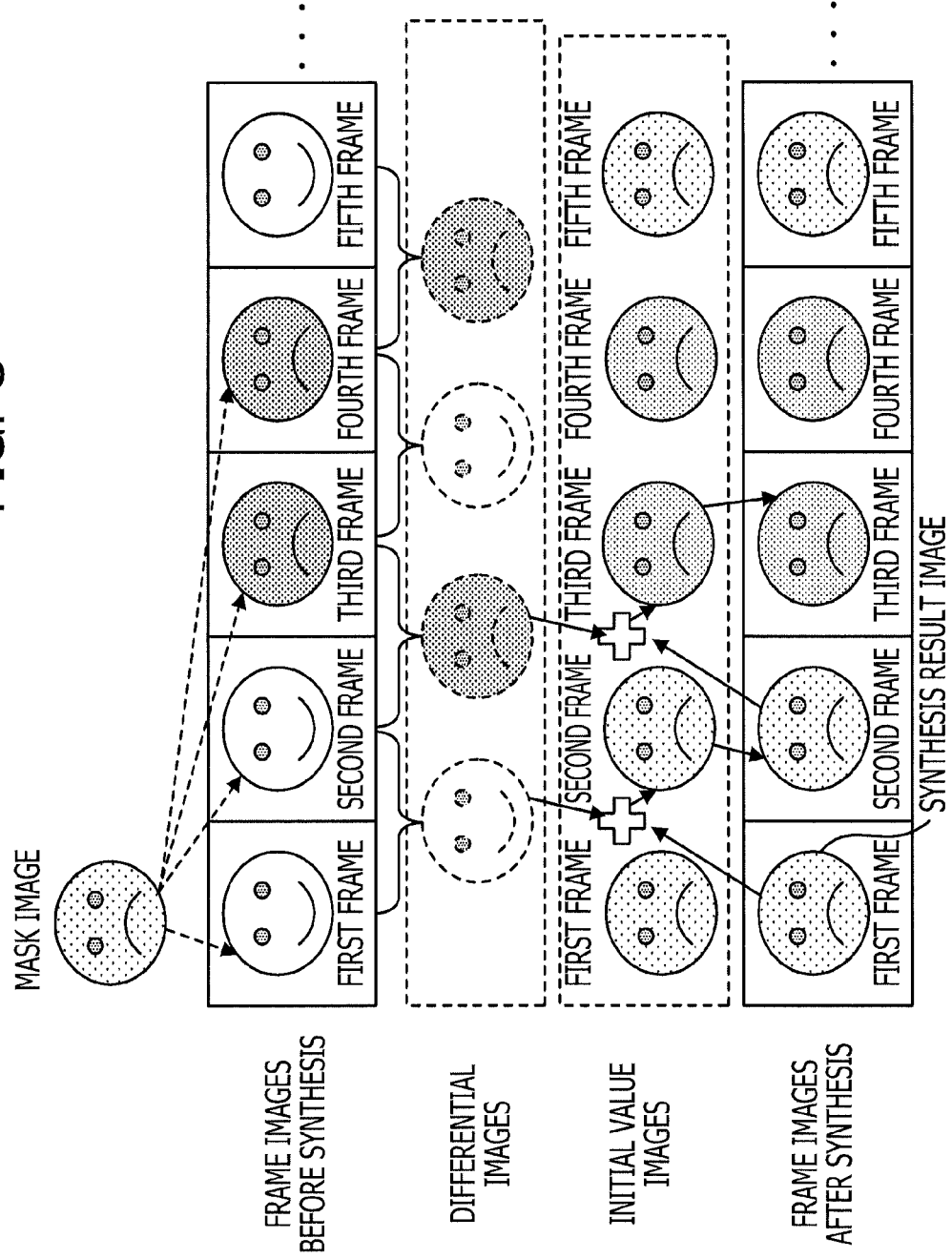
FIG. 8 is an outline diagram describing setting of an initial value image according to the second embodiment.

In step 184, the differential image calculator 52 calculates a differential image (refer to a "differential image" illustrated in FIG. 8) representing the difference between the synthesis target region of the N−1th frame image of the color component j and the synthesis target region of the Nth frame image of the color component j. In step 186, the initial value image setting unit 44 sets, as the initial value image I, an image obtained by adding the differential image calculated by the differential image calculator 52 to the synthesis result image F obtained from the N−1th frame image of the color component j and corrected by the position and size corrector 42. As illustrated in FIG. 8, the initial value image I is used as initial values of the synthesis result image F synthesized in the mask image synthesis process executed by the mask image synthesizer 46.

As described above, the initial value image I according to the second embodiment is obtained by correcting the synthesis result image F obtained from the N−1th frame image of the color component j on the basis of the difference (specifically, the difference between the color components j) between the luminance of the N−1th frame image and the luminance of the Nth frame image. The initial value image I is more similar to the synthesis result image F finally obtained in the mask image synthesis process, compared with the first embodiment in which the synthesis result image F obtained from the N−1th frame image of the color component j is used as the initial value image I.

Thus, satisfying the convergence requirement reduces the number of times of the calculation repeated until the lastly repeated calculation of the mask image synthesis process is completed (the amount of data to be calculated is reduced). The mask image synthesis process is completed for a short time. In the second embodiment, the initial value image I is similar to the synthesis result image F finally obtained in the mask image synthesis process, and whereby the amount of data to be calculated is reduced. The quality of the finally obtained synthesis result image F is not reduced.

Next, the third embodiment of the techniques disclosed herein is described. Parts that are the same as those described in the second embodiment are indicated by the same reference numerals as those described in the second embodiment, and a description thereof is omitted. Only differences between the second and third embodiments are described below.

FIG. 9 illustrates an image processing device 10 according to the third embodiment. In the image processing device 10 according to the third embodiment, the differential image calculator 52 is connected to the mask image synthesizer 46 and outputs a differential image calculated by the differential image calculator 52 to the mask image synthesizer 46. Only this feature is different from the image processing device 10 described in the second embodiment.

Next, as effects of the third embodiment, only differences between a mask synthesis process according to the third embodiment and the mask synthesis process (illustrated in FIG. 7) according to the second embodiment are described.

Figure 11:
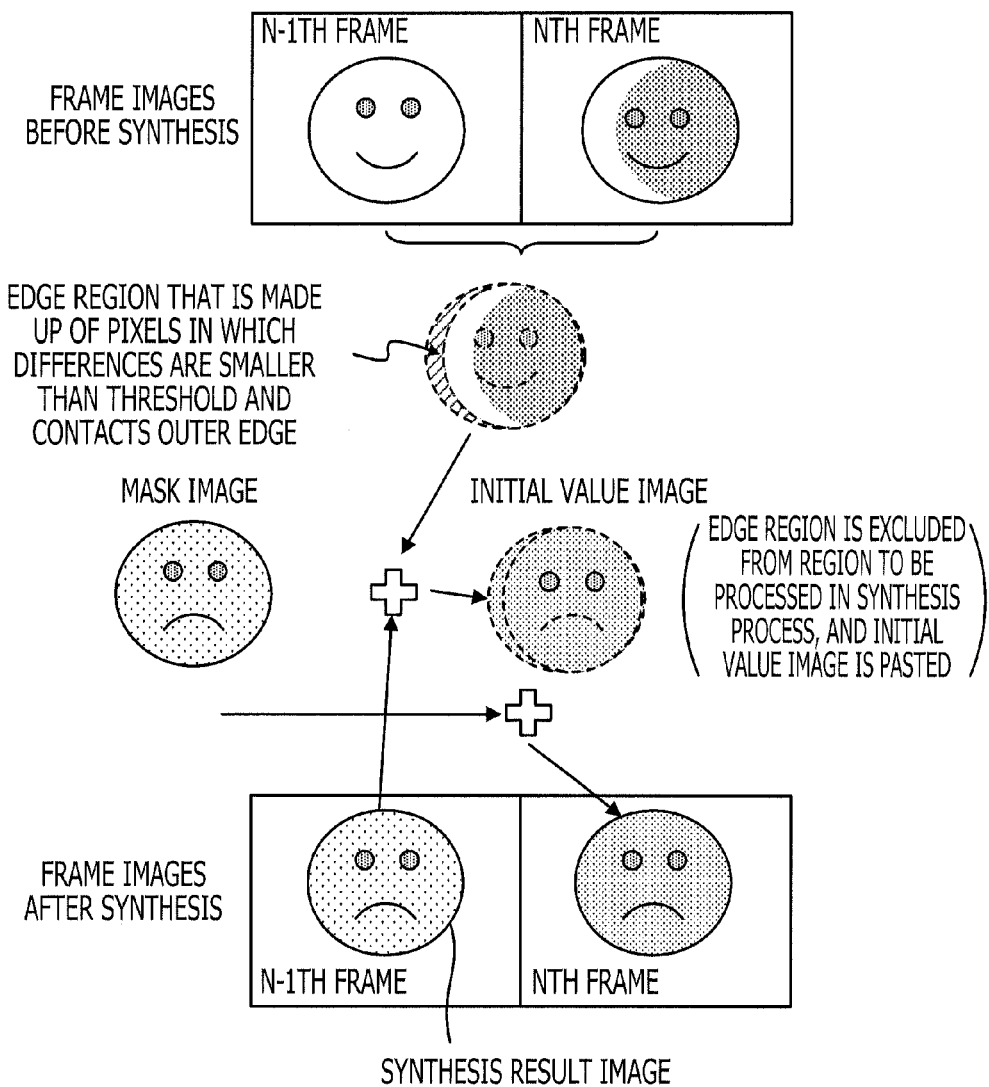
FIG. 11 is an outline diagram describing setting of an initial value image according to the third embodiment.

In the mask synthesis process according to the third embodiment, after the initial value image setting unit 44 sets the initial value image I in step 186, the mask synthesis process proceeds to step 190. In step 190, the mask image synthesizer 46 extracts an edge region that is included in the synthesis target region, made up of pixels in which differences included in the differential image calculated by the differential image calculator 52 are smaller than the preset threshold, and contacts an outer edge of the synthesis target region. As an example of the threshold, approximately 1% of the number of gray levels of pixels may be used (for example, if each of values of the pixels is represented by 256 gray levels, the threshold is 2.56). As the edge region that is made up of the pixels in which the differences are smaller than the threshold and contacts the outer edge of the synthesis target region, a region indicated by hatching in FIG. 11 is extracted by the aforementioned process, for example.

In step 192, the mask image synthesizer 46 excludes the edge region extracted from the synthesis target region in step 190 from the synthesis target region to be processed in the mask image synthesis process. In the next step 164, the mask image synthesizer 46 executes the mask image synthesis process on the synthesis target region from which the edge region extracted from the synthesis target region in step 190 has been excluded. In this case, as the boundary γ, the outer edge of the synthesis target region that is included in the Nth frame image (to be processed) and from which the edge region has been excluded is used. Then, a synthesis result image F is calculated from the synthesis target region from which the edge region has been excluded.

In the next step 194, the mask image synthesizer 46 determines whether or not the edge region to be excluded from the region to be processed in the mask image synthesis process exists. If the answer to the determination of step 194 is negative, the mask synthesis process proceeds to step 166. If the answer to the determination of step 194 is positive, the mask synthesis process proceeds to step 196. In step 196, the mask image synthesizer 46 sets values of pixels of a region corresponding to the edge region and included in the initial value image set by the initial value image setting unit 44 in the edge region excluded from the synthesis target region to be processed in the mask image synthesis process without any change. Then, the mask synthesis process proceeds to step 166. Instead of the initial value image, values of pixels of a region corresponding to the edge region and included in the synthesis result image F obtained from the N−1th frame image of the color component j may be used.

A certain region, which is included in a synthesis target region of a certain frame image, contacts an outer edge of the synthesis target region and causes the difference between the luminance or the like of the certain region and the luminance or the like of a synthesis target region of a frame image preceding the certain frame image to be zero or very small, is very similar to the synthesis result image F finally obtained in the mask image synthesis process. This feature is used in the third embodiment. The edge region that is made up of the pixels in which the differences included in the differential image are smaller than the threshold and contacts the outer edge of the synthesis target region is excluded from the region to be processed in the mask image synthesis process, and the values of the pixels of the region corresponding to the edge region and included in the initial value image are set without any change.

Thus, the area of the region to be processed in the mask image synthesis process is reduced, and each of time periods for the repeated calculation is reduced (the amount of data to be calculated is reduced). The mask image synthesis process is completed for a short time. In the third embodiment, a region in which the finally obtained synthesis result image F is almost not changed is excluded from the region to be processed in the mask image synthesis process, and whereby the amount of data to be calculated is reduced. The quality of the finally obtained synthesis result image F is almost not affected.

Figure 12:
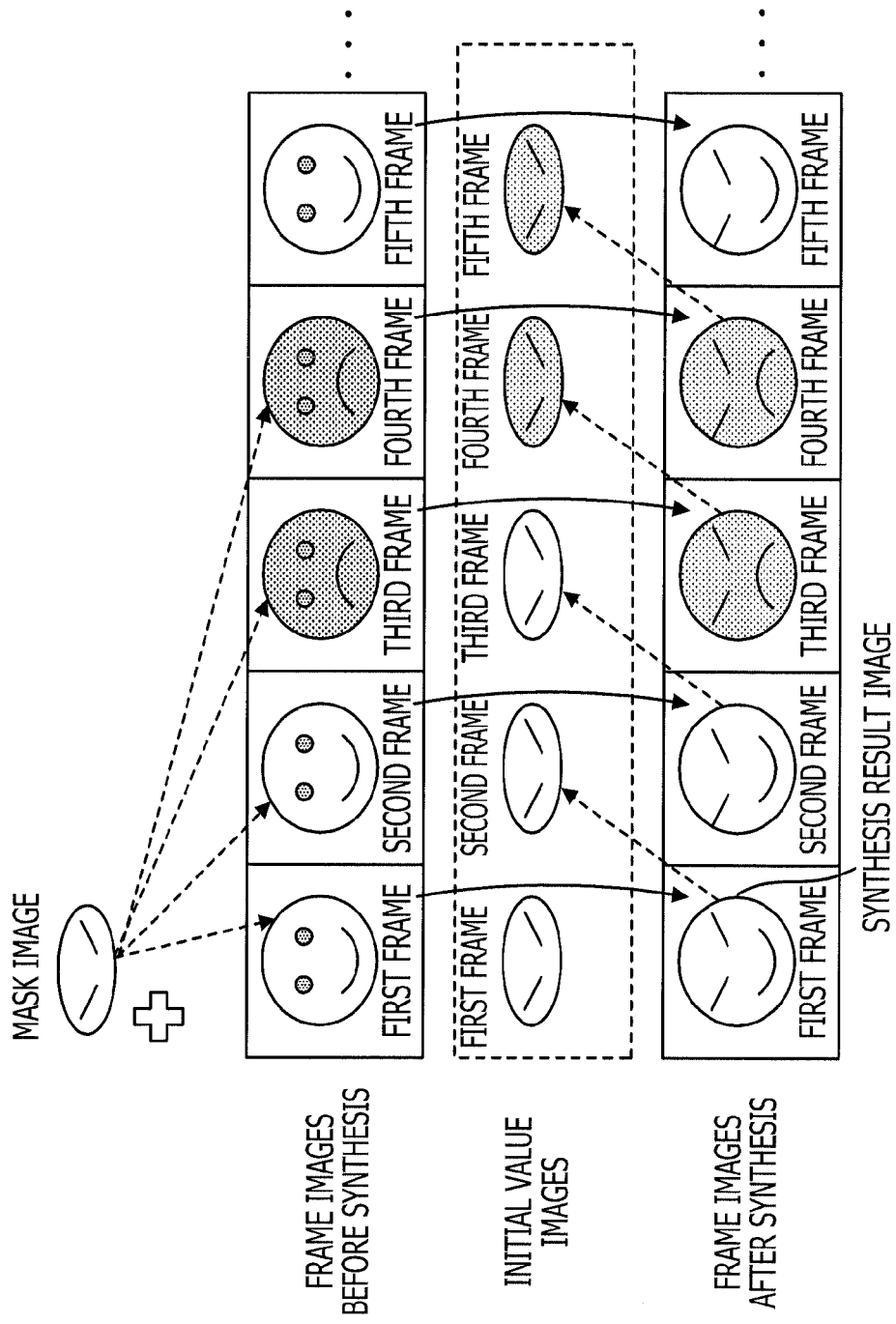
FIG. 12 is an outline diagram describing another embodiment of techniques disclosed herein.

In the above description, the facial region that corresponds to the face of the person is used as the synthesis target region. The synthesis target region is not limited to the facial region. A region other than the facial region may be used as the synthesis target region. For example, if the purpose is to protect privacy of a certain person, it is effective and preferable that an eye region that is included in the facial region is used as the synthesis target region, and that a mask image that represents eyes of another person is synthesized with the synthesis target region so as to inhibit the certain person from being identified, as illustrated in FIG. 12. If the eye region is used as the synthesis target region, an image that represents an eye region of a person other than the certain person appearing as an object in a video image, an image that represents the average of eyes of people, or the like is set as the mask image.

FIG. 12 illustrates that a synthesis result image (image of an eye region) obtained by synthesizing the mask image with a frame image preceding a frame to be processed is used as an initial value image of the frame to be processed without any change. The initial value image, however, is not limited to the synthesis result image. For example, as described in the second embodiment, the following image may be used as the initial value image: an image that is obtained by adding the synthesis result image obtained from the frame image preceding the frame to be processed to a differential image representing differences between an eye region of the preceding frame image and an eye region of the image of the frame to be processed. As described in the third embodiment, an edge region that is made up of pixels in which differences included in the differential image are smaller than the threshold and contacts an outer edge of a synthesis target region may be excluded from the image of the frame to be processed, and the mask image may be synthesized with the synthesis target region from which the edge region has been excluded.

In the above description, the Nth frame image is synthesized with the mask image for each of the color components. The synthesis process, however, is not limited to this. The Nth frame images may be synthesized with the mask image for the color components in parallel.

In the above description, the color video image is used as the video image to be processed. The video image is not limited to the color video image. A monochrome video image may be used as the video image to be processed.

In each of Equations (1), (4), (5), (6) and (8), values are calculated by applying the Laplacian filter using 4 pixels located on the upper, lower, left and right sides of a pixel to be calculated. Each of the calculations may be executed using more pixels (for example, 8 pixels surrounding the pixel to be calculated). Instead of the Laplacian filter, another filter that provides a value corresponding to a second order differential may be used.

In the techniques disclosed herein, a mask image that is set for the purpose of protecting privacy is synthesized with a synthesis target region that corresponds to a person appearing in each of frames of a video image. The techniques disclosed herein are not limited to this. In the techniques disclosed herein, a general image other than mask images may be used and synthesized. The synthesis target regions are not limited to the regions corresponding to the person appearing in each of the frames of the video image. The image (synthesis image) to be synthesized is not limited to the mask image set for the purpose of protecting privacy. The image to be synthesized is not limited to the still image. A video image may be used as the image to be synthesized.

The embodiments describe that the storage unit 66 has stored (installed) therein the mask synthesis program that is an example of the image processing program included in the techniques disclosed herein. The image processing program included in the techniques disclosed herein may be stored in a storage medium such as a CD-ROM or a DVD-ROM and provided.

All the documents, the technical standards and the patent application that are described in this specification are incorporated herein by reference to the same extent as if each individual document, technical standard or patent application was specifically and individually incorporated herein by reference.

Results of an experiment conducted to confirm effects of the techniques disclosed herein are described below. In the experiment, the following three cases were compared: a case (1) in which a mask image was used as an initial value image, a case (2) in which a synthesis result image obtained from a frame preceding a frame to be processed was used as the initial value image and a case (3) in which an image obtained by adding the synthesis result image obtained from the preceding frame to a differential image representing differences between an image of the preceding frame and an image of the frame to be processed was used as the initial value image. The case (2) corresponds to the first embodiment, while the case (3) corresponds to the second embodiment.

In each of the cases (1) to (3), video images 1 to 4 were synthesized with the mask image, and the number of times of the calculation repeatedly executed for each of frames in the mask image synthesis process was measured. The number of times of the calculation repeatedly executed in the mask image synthesis process varied depending on the frame. Thus, in each of the cases (1) to (3), the average of the numbers of times of the calculation repeatedly executed for the frames was calculated for each of the video images as the number of times of the calculation repeatedly executed per frame. The numbers of times of the calculation repeatedly executed per frame were compared. The results are indicated in the following Table 1 and illustrated in FIG. 13.

TABLE 1

|  |  | Video image 1 | Video image 2 | Video image 3 | Video image 4 |
|---|---|---|---|---|---|
| Number of times of repeated calculation per frame | (1) Initial value image = mask image | 1922.016 | 1848.257 | 2620.627 | 1789.576 |
|  | (2) Initial value image = synthesis result image obtained from preceding frame | 1175.033 | 1366.836 | 931.1364 | 1227.672 |
|  | (3) Initial value image = image obtained by adding synthesis result image obtained from preceding frame to differential image | 979.2459 | 1091.274 | 885.2576 | 1051.603 |
| Difference between numbers of times of repeated calculation | (1) − (2) | 746.9833 | 481.4211 | 1689.491 | 561.9039 |
|  | (2) − (3) | 195.7869 | 275.5616 | 45.87879 | 176.069 |
| Rate of reduction in amount of data to be calculated | (1) − (2) | 38.9% | 26.0% | 64.5% | 31.4% |
|  | (2) − (3) | 16.7% | 20.2% | 4.9% | 14.3% |

Figure 13:
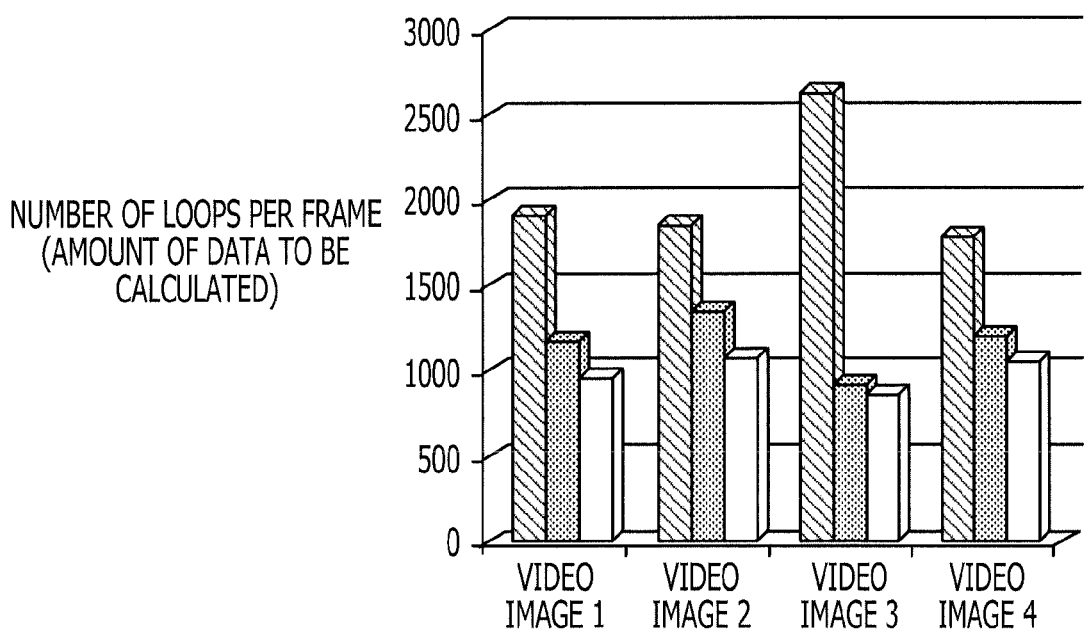
FIG. 13 is a diagrammatic view of an example of experimental results.

As is apparent from Table 1 and FIG. 13, when the case (2) is compared with the case (1), the numbers of times of the calculation repeatedly executed per frame for the video images 1 to 4 or the amounts of data to be calculated for the video images 1 to 4 vary but are reduced by 26.0% to 64.5%. The significant reductions in the amounts of the data to be calculated were confirmed. When the case (3) is compared with the case (2), the numbers of times of the calculation repeatedly executed per frame (the amounts of data to be calculated) are reduced by 4.9% to 20.2%. It was confirmed that the amounts of data to be calculated were reduced by using, as the initial value image, the image obtained by adding the synthesis result image obtained from the preceding frame to the differential image representing the differences between the image of the preceding frame and the image of the frame to be processed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing an image processing program that causes a computer to execute a process comprising:

synthesizing, for each of frames included in a video image to be processed, a synthesis image with an image of a synthesis target region existing in the frame by repeatedly executing a calculation using a Poisson's equation on the basis of the image of synthesis target region existing in the frame to be processed and the synthesis image to be replaced with the image of the synthesis target region, and thereby calculating, from an initial value image, a synthesis result image corresponding to a result obtained by synthesizing the synthesis image with the synthesis target region so as to sequentially execute a synthesis process on the frames of the video image; and setting, for each of the frames to be processed, initial values by setting, as the initial value image used for the calculation executed in the synthesizing, a synthesis result image calculated from a frame that precedes the frame to be processed and is among the frames of the video image.

2. The non-transitory computer-readable storage medium according to claim 1, further comprising:

calculating, for each of pixels, a difference between the image of the synthesis target region existing in the frame to be processed and an image of a synthesis target region existing in the frame preceding the frame to be processed, wherein the setting is to set, as the initial value image used for the calculation repeatedly executed in the synthesizing on the frame to be processed, an image obtained by adding a differential image representing the differences calculated for the pixels to the synthesis result image calculated from the preceding frame.

3. The non-transitory computer-readable storage medium according to claim 2, wherein the synthesizing is to exclude, from the synthesis target region to be subjected to the calculation to be repeatedly executed, an edge region that is included in the synthesis target region included in the frame to be processed, is made up of pixels in which the differences calculated for the pixels in the calculating are smaller than a threshold, and contacts an outer edge of the synthesis target region, and to set, in the edge region of the synthesis target region of the frame to be processed, values of a region that is included in the initial value image set in the initial value setting and corresponds to the edge region.

4. The non-transitory computer-readable storage medium according to claim 1, further comprising:
  detecting the position and size of the synthesis target region existing in the frame to be processed, and detecting amounts of changes in position and size of the synthesis target region existing in the frame to be processed with respect to the synthesis target region existing in the frame preceding the frame to be processed; and
  correcting, on the basis of the position, the size and the amounts detected in the detecting, the position and size of the synthesis image used for the calculation of the synthesis result image from the frame to be processed and the position and size of the synthesis result image calculated from the preceding frame so that the position and size of the synthesis image and the position and size of the synthesis result image calculated from the preceding frame match the position and size of the synthesis target region existing in the frame to be processed.

5. The non-transitory computer-readable storage medium according to claim 1,
  wherein the images of the frames of the video image are color images,
  wherein the synthesizing is to calculate a synthesis result image for each of pixels in the synthesis process, and
  wherein the initial value setting is to set an initial value image for each of the pixels.

6. The non-transitory computer-readable storage medium according to claim 1,
  wherein the synthesis target region is a region corresponding to a person's face or a part of the person's face.

7. An image processing device comprising:
  a processor; and
  a memory which stores a plurality of instructions, which when executed by the processor, cause the processor to execute the instructions;
  synthesizing, for each of frames included in a video image to be processed, a synthesis image with an image of a synthesis target region existing in the frame by repeatedly executing a calculation using a Poisson's equation on the basis of the image of synthesis target region existing in the frame to be processed and the synthesis image to be replaced with the image of the synthesis target region, and thereby calculating, from an initial value image, a synthesis result image corresponding to a result obtained by synthesizing the synthesis image with the synthesis target region so as to sequentially execute a synthesis process on the frames of the video image; and
  setting, for each of the frames to be processed, initial values by setting, as the initial value image used for the calculation executed in the synthesizing, a synthesis result image calculated from a frame that precedes the frame to be processed and is among the frames of the video image.

8. The device according to claim 7, the instructions further comprising:
  calculating, for each of pixels, a difference between the image of the synthesis target region existing in the frame to be processed and an image of a synthesis target region existing in the frame preceding the frame to be processed,
  wherein the setting is to set, as the initial value image used for the calculation repeatedly executed in the synthesizing on the frame to be processed, an image obtained by adding a differential image representing the differences calculated for the pixels to the synthesis result image calculated from the preceding frame.

9. The device according to claim 8,
  wherein the synthesizing is to exclude, from the synthesis target region to be subjected to the calculation to be repeatedly executed, an edge region that is included in the synthesis target region included in the frame to be processed, is made up of pixels in which the differences calculated for the pixels in the calculating are smaller than a threshold, and contacts an outer edge of the synthesis target region, and to set, in the edge region of the synthesis target region of the frame to be processed, values of a region that is included in the initial value image set in the initial value setting and corresponds to the edge region.

10. The device according to claim 7, the instructions further comprising:
  detecting the position and size of the synthesis target region existing in the frame to be processed, and detecting amounts of changes in position and size of the synthesis target region existing in the frame to be processed with respect to the synthesis target region existing in the frame preceding the frame to be processed; and
  correcting, on the basis of the position, the size and the amounts detected in the detecting, the position and size of the synthesis image used for the calculation of the synthesis result image from the frame to be processed and the position and size of the synthesis result image calculated from the preceding frame so that the position and size of the synthesis image and the position and size of the synthesis result image calculated from the preceding frame match the position and size of the synthesis target region existing in the frame to be processed.

11. The device according to claim 7,
  wherein the images of the frames of the video image are color images,
  wherein the synthesizing is to calculate a synthesis result image for each of pixels in the synthesis process, and
  wherein the initial value setting is to set an initial value image for each of the pixels.

12. The device according to claim 7,
  wherein the synthesis target region is a region corresponding to a person's face or a part of the person's face.

13. An image processing method comprising:
  synthesizing, by a computer processor, for each of frames included in a video image to be processed, a synthesis image with an image of a synthesis target region existing in the frame by repeatedly executing a calculation using a Poisson's equation on the basis of the image of synthesis target region existing in the frame to be processed and the synthesis image to be replaced with the image of the synthesis target region, and thereby calculating, from an initial value image, a synthesis result image corresponding to a result obtained by synthesizing the synthesis image with the synthesis target region so as to sequentially execute a synthesis process on the frames of the video image; and
  setting, for each of the frames to be processed, initial values by setting, as the initial value image used for the calculation executed in the synthesizing, a synthesis result image calculated from a frame that precedes the frame to be processed and is among the frames of the video image.

14. The method according to claim 13, the instructions further comprising:
  calculating, for each of pixels, a difference between the image of the synthesis target region existing in the frame to be processed and an image of a synthesis target region existing in the frame preceding the frame to be processed, wherein the setting is to set, as the initial value image used for the calculation repeatedly executed in the synthesizing on the frame to be processed, an image obtained by adding a differential image representing the differences calculated for the pixels to the synthesis result image calculated from the preceding frame.

15. The method according to claim 14,
wherein the synthesizing is to exclude, from the synthesis target region to be subjected to the calculation to be repeatedly executed, an edge region that is included in the synthesis target region included in the frame to be processed, is made up of pixels in which the differences calculated for the pixels in the calculating are smaller than a threshold, and contacts an outer edge of the synthesis target region, and to set, in the edge region of the synthesis target region of the frame to be processed, values of a region that is included in the initial value image set in the initial value setting and corresponds to the edge region.

16. The method according to claim 13, the instructions further comprising:
detecting the position and size of the synthesis target region existing in the frame to be processed, and detecting amounts of changes in position and size of the synthesis target region existing in the frame to be processed with respect to the synthesis target region existing in the frame preceding the frame to be processed; and correcting, on the basis of the position, the size and the amounts detected in the detecting, the position and size of the synthesis image used for the calculation of the synthesis result image from the frame to be processed and the position and size of the synthesis result image calculated from the preceding frame so that the position and size of the synthesis image and the position and size of the synthesis result image calculated from the preceding frame match the position and size of the synthesis target region existing in the frame to be processed.

17. The method according to claim 13,
wherein the images of the frames of the video image are color images,
wherein the synthesizing is to calculate a synthesis result image for each of pixels in the synthesis process, and
wherein the initial value setting is to set an initial value image for each of the pixels.

18. The method according to claim 13,
wherein the synthesis target region is a region corresponding to a person's face or a part of the person's face.

19. The non-transitory computer-readable storage medium according to claim 1,
wherein the synthesis result image is calculated from a mask image.

* * * * *